(12) United States Patent
Barraclough et al.

(10) Patent No.: US 8,335,989 B2
(45) Date of Patent: Dec. 18, 2012

(54) METHOD AND APPARATUS FOR PRESENTING POLYMORPHIC NOTES IN A GRAPHICAL USER INTERFACE

(75) Inventors: Keith Barraclough, Mountain View, CA (US); Stephen Andrew Hartford, San Jose, CA (US); David Michael Irvine, San Jose, CA (US); Energy Cruse, Foster City, CA (US); Abbe Don, San Francisco, CA (US); Luke Patrick Woods, San Francisco, CA (US); Christopher Mark Dame, San Francisco, CA (US); Timm Kekeritz, Berlin (DE); Astrid Jantina Van Der Flier, San Francisco, CA (US); Kristian Russell Thomas Simsarian, San Francisco, CA (US); James Nathaniel Gerlach, Santa Clara, CA (US); Erich Ian Domingo, Hayward, CA (US); Christopher Nyffeler, San Francisco, CA (US); Anke Pierik, Hayward, CA (US)

(73) Assignee: Nokia Corporation, Espoo (FI)

( * ) Notice: Subject to any disclaimer, the term of this patent is extended or adjusted under 35 U.S.C. 154(b) by 186 days.

(21) Appl. No.: 12/606,011

(22) Filed: Oct. 26, 2009

(65) Prior Publication Data
US 2011/0099490 A1    Apr. 28, 2011

(51) Int. Cl.
*G06F 3/048*    (2006.01)
(52) U.S. Cl. .................................... 715/764; 715/733
(58) Field of Classification Search .............. 715/764, 715/733; 435/6.11
See application file for complete search history.

(56) References Cited

U.S. PATENT DOCUMENTS

| 5,208,748 | A | | 5/1993 | Flores et al. |
| 5,371,675 | A | * | 12/1994 | Greif et al. ..................... 715/220 |
| 5,398,310 | A | * | 3/1995 | Tchao et al. .................. 715/234 |
| 5,563,996 | A | * | 10/1996 | Tchao ............................ 715/201 |
| 5,581,681 | A | * | 12/1996 | Tchao et al. .................. 715/234 |
| 5,590,256 | A | * | 12/1996 | Tchao et al. .................. 715/234 |
| 5,689,666 | A | * | 11/1997 | Berquist et al. ............... 715/797 |

(Continued)

FOREIGN PATENT DOCUMENTS

KR    2003-0092819    12/2003

(Continued)

OTHER PUBLICATIONS

International search report and written opinion for corresponding international application No. PCT/FI2010/050725 dated Jan. 31, 2011, pp. 1-14.

(Continued)

*Primary Examiner* — Doon Chow
*Assistant Examiner* — David Choi
(74) *Attorney, Agent, or Firm* — Ditthavong Mori & Steiner, P.C.

(57) ABSTRACT

An approach is provided for presenting polymorphic notes in a graphical user interface. A polymorphic note manager receives a request to display a plurality of polymorphic notes on a graphical user interface of a device. In response to the request, the polymorphic note manager determines an order of the plurality of polymorphic notes according to either an associated date or, if there is no associated date, a creation date corresponding to each of the plurality of polymorphic notes. The polymorphic note manager then causes, at least in part, actions that result in display of the plurality of polymorphic notes in the graphical user interface according to the determined order.

17 Claims, 18 Drawing Sheets

U.S. PATENT DOCUMENTS

| | | | |
|---|---|---|---|
| 5,874,953 A * | 2/1999 | Webster et al. | 715/733 |
| 5,895,475 A * | 4/1999 | Eisenberg | 715/209 |
| 5,898,431 A * | 4/1999 | Webster et al. | 715/841 |
| 5,923,326 A * | 7/1999 | Bittinger et al. | 715/805 |
| 5,949,413 A * | 9/1999 | Lerissa et al. | 715/733 |
| 6,052,121 A * | 4/2000 | Webster et al. | 715/733 |
| 6,381,618 B1 * | 4/2002 | Jones et al. | 1/1 |
| 6,774,786 B1 | 8/2004 | Havekost et al. | |
| 7,039,654 B1 * | 5/2006 | Eder | 1/1 |
| 7,107,312 B2 | 9/2006 | Hackbarth et al. | |
| 7,233,906 B1 | 6/2007 | Aghili et al. | |
| 7,383,291 B2 | 6/2008 | Guinheneuf et al. | |
| 7,460,020 B2 | 12/2008 | Reyes et al. | |
| 2002/0085034 A1 | 7/2002 | Cortright | |
| 2002/0194246 A1 | 12/2002 | Moskowitz et al. | |
| 2002/0196284 A1 | 12/2002 | Berquist et al. | |
| 2003/0063136 A1 * | 4/2003 | J'maev | 345/864 |
| 2003/0076352 A1 | 4/2003 | Uhlig et al. | |
| 2003/0130872 A1 | 7/2003 | Dvorak et al. | |
| 2004/0111694 A1 * | 6/2004 | Wang et al. | 717/100 |
| 2004/0153453 A1 | 8/2004 | Brodie et al. | |
| 2005/0015624 A1 | 1/2005 | Ginter et al. | |
| 2005/0021369 A1 * | 1/2005 | Cohen et al. | 705/2 |
| 2005/0091578 A1 | 4/2005 | Madan et al. | |
| 2005/0132006 A1 | 6/2005 | Horvitz | |
| 2006/0031365 A1 | 2/2006 | Kay et al. | |
| 2006/0050860 A1 | 3/2006 | Baker | |
| 2006/0224433 A1 | 10/2006 | Baek et al. | |
| 2007/0106931 A1 | 5/2007 | Vartiainen et al. | |
| 2007/0168892 A1 * | 7/2007 | Brush et al. | 715/963 |
| 2007/0174255 A1 * | 7/2007 | Sravanapudi et al. | 707/3 |
| 2007/0282595 A1 | 12/2007 | Tunning et al. | |
| 2008/0004926 A1 | 1/2008 | Horvitz et al. | |
| 2008/0034315 A1 | 2/2008 | Langoulant et al. | |
| 2008/0040674 A1 * | 2/2008 | Gupta | 715/745 |
| 2008/0109543 A1 | 5/2008 | Abanami et al. | |
| 2008/0148320 A1 | 6/2008 | Howcroft | |
| 2008/0195705 A1 | 8/2008 | Lee | |
| 2008/0209344 A1 | 8/2008 | Knapp et al. | |
| 2008/0319818 A1 | 12/2008 | Gurdin et al. | |
| 2009/0015402 A1 | 1/2009 | Reifman | |
| 2009/0024952 A1 | 1/2009 | Brush et al. | |
| 2009/0036148 A1 | 2/2009 | Yach | |
| 2009/0037832 A1 | 2/2009 | Falchuk et al. | |
| 2009/0055415 A1 | 2/2009 | Golds et al. | |
| 2009/0158173 A1 * | 6/2009 | Palahnuk et al. | 715/753 |
| 2009/0164236 A1 * | 6/2009 | Gounares et al. | 705/2 |
| 2009/0193353 A1 * | 7/2009 | Sharp et al. | 715/784 |
| 2009/0228322 A1 | 9/2009 | van Os et al. | |
| 2009/0307607 A1 | 12/2009 | Schauls et al. | |
| 2009/0327169 A1 | 12/2009 | Kamar et al. | |
| 2010/0042592 A1 | 2/2010 | Stolz et al. | |
| 2010/0099462 A1 | 4/2010 | Baek et al. | |
| 2010/0180212 A1 * | 7/2010 | Gingras et al. | 715/751 |
| 2010/0197463 A1 | 8/2010 | Haughay, Jr. et al. | |
| 2010/0324948 A1 * | 12/2010 | Kumar et al. | 705/7 |
| 2011/0093619 A1 * | 4/2011 | Nelson | 709/248 |
| 2011/0099490 A1 * | 4/2011 | Barraclough et al. | 715/764 |

FOREIGN PATENT DOCUMENTS

| | | |
|---|---|---|
| WO | WO 2009/061796 A1 | 5/2009 |

OTHER PUBLICATIONS

International search report and written opinion for corresponding international application No. PCT/FI2010/050727 dated Jan. 28, 2011, pp. 1-13.

International search report and written opinion for corresponding international application No. PCT/FI2010/051042 dated Apr. 6, 2011, pp. 1-13.

Cardelli, "Basic Polymorphic Typechecking", Jun. 21, 1988, pp. 1-29, Science of Computer Programming.

Chande et al., "Active Note: Context-sensitive Notes for Mobile Devices", Sep. 10, 2007, pp. 716-723, Proc. of the 4th Int'l Conf. on Mobile Technology, Applications and Systems.

Office Action for related U.S. Appl. No. 12/605,934, dated Jan. 19, 2012, pp. 1-61.

Office Action for related U.S. Appl. No. 12/606,085 dated Jan. 10, 2012, pp. 1-40.

Final Rejection for related U.S. Appl. No. 12/606,085 dated Jun. 8, 2012, pp. 1-26.

Final Rejection for related U.S. Appl. No. 12/731,784 dated Aug. 7, 2012, pp. 1-32.

\* cited by examiner

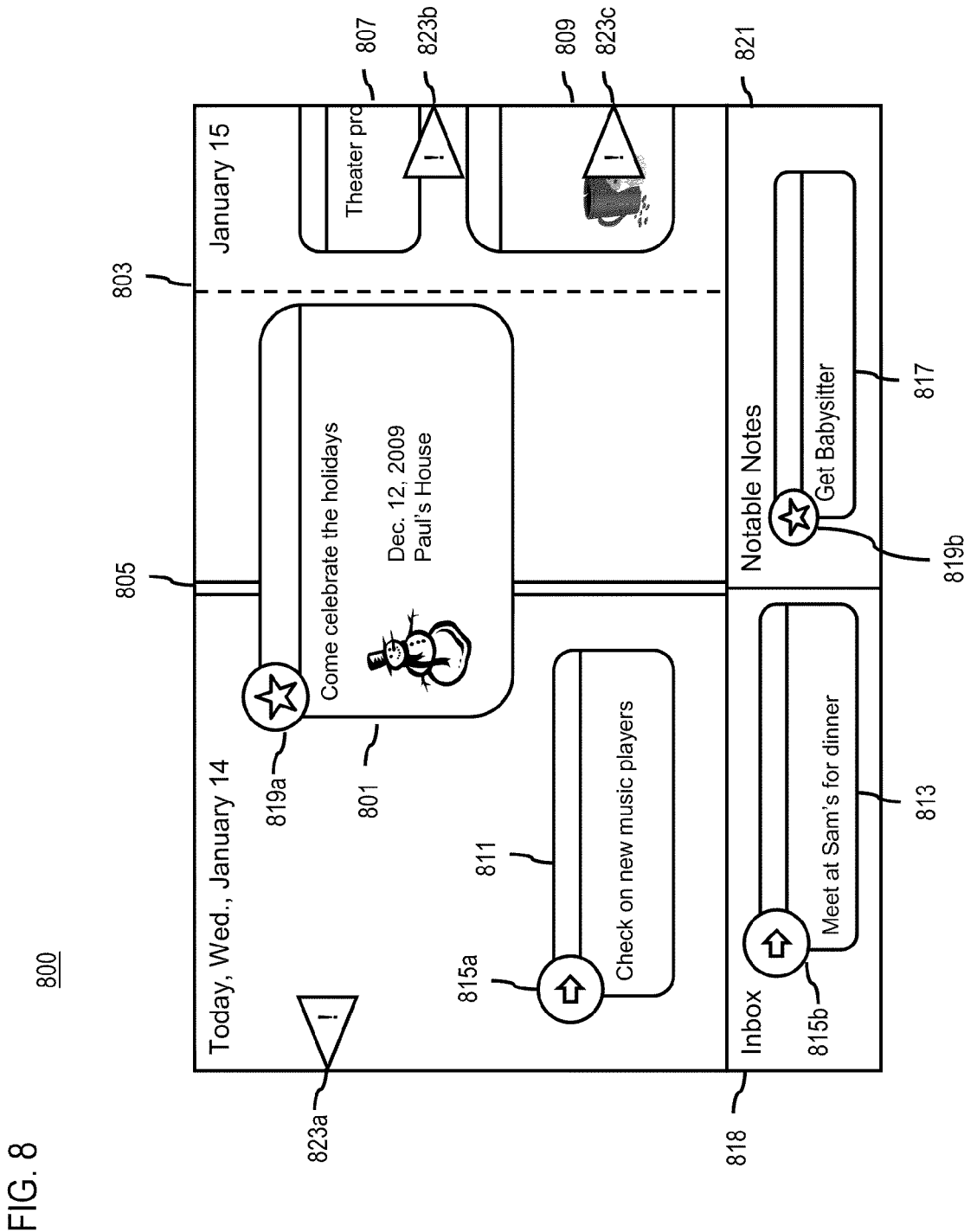

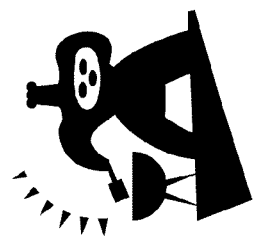

| Personal Notebook | To-Do List | Delete | Create Related Note | Duplicate Note |

Come celebrate the holidays with us in an evening of dancing, cocktails and eggnog.

Friday Dec. 12th from 19:30 until who knows?...
           1321          1325

The address is 340 Moon Street. Hope to see
                      1327 you there!

Time:
Friday, December 12, 2009 — 1323
19:30

People:

Location:
340 Moon Street — 1329
San Francisco, CA 94107

Reminders:

1305, 1303, 1301

METHOD AND APPARATUS FOR PRESENTING POLYMORPHIC NOTES IN A GRAPHICAL USER INTERFACE

BACKGROUND

Service providers and device manufacturers are continually challenged to deliver value and convenience to consumers by, for example, providing compelling network services and advancing the underlying technologies. One area of interest has been the development of services and technologies for personal information management (e.g., calendaring, task management, goal planning, and the like). In particular, service providers and device manufacturers face significant technical challenges in adapting such personal information management services for organizing and planning the personal and social lives of users where events, goals, and plans are fluid, dynamic, and nebulous.

SOME EXAMPLE EMBODIMENTS

Therefore, there is a need for an approach for intuitively organizing information (e.g., personal and social information) using a polymorphic note capable of evolving as the information develops and presenting the polymorphic note to the user.

According to one embodiment, a method comprises receiving a request to display a plurality of polymorphic notes on a graphical user interface of a device. The method also comprises determining an order of the plurality of polymorphic notes according to either an associated date or, if there is no associated date, a creation date corresponding to each of the plurality of polymorphic notes. The method further comprises causing, at least in part, actions that result in display of the plurality of polymorphic notes in the graphical user interface according to the determined order.

According to another embodiment, an apparatus comprising at least one processor, and at least one memory including computer program code, the at least one memory and the computer program code configured to, with the at least one processor, cause, at least in part, the apparatus to receive a request to display a plurality of polymorphic notes on a graphical user interface of a device. The apparatus is also caused to determine an order of the plurality of polymorphic notes according to either an associated date or, if there is no associated date, a creation date corresponding to each of the plurality of polymorphic notes. The apparatus further causes, at least in part, actions that result in display of the plurality of polymorphic notes in the graphical user interface according to the determined order.

According to another embodiment, a computer-readable storage medium carrying one or more sequences of one or more instructions which, when executed by one or more processors, cause, at least in part, an apparatus to receive a request to display a plurality of polymorphic notes on a graphical user interface of a device. The apparatus is also caused to determine an order of the plurality of polymorphic notes according to either an associated date or, if there is no associated date, a creation date corresponding to each of the plurality of polymorphic notes. The apparatus is further causes, at least in part, actions that result in display of the plurality of polymorphic notes in the graphical user interface according to the determined order.

According to another embodiment, an apparatus comprises means for receiving a request to display a plurality of polymorphic notes on a graphical user interface of a device. The apparatus also comprises means for determining an order of the plurality of polymorphic notes according to either an associated date or, if there is no associated date, a creation date corresponding to each of the plurality of polymorphic notes. The apparatus further comprises means for causing, at least in part, actions that result in display of the plurality of polymorphic notes in the graphical user interface according to the determined order.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram of a graphical user interface presenting polymorphic notes, according to one embodiment;

FIG. 12 is a diagram of a user interface for interacting with a polymorphic note, according to one embodiment;

FIGS. 13A and 13B are diagrams of user interfaces for entering information into a polymorphic note, according to various exemplary embodiments;

DESCRIPTION OF SOME EMBODIMENTS

Examples of a method, apparatus, and computer program for presenting polymorphic notes in a graphical user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used in the approach described herein, a polymorphic note is a common object model for information that relieves users of the need to decide if they are creating a meeting, an event, a task, or a simple memo. The polymorphic note supports a variety of information traditionally corresponding to separate and distinct application types (e.g., a calendar application, a task management application, a note application, an e-mail application, an instant messaging application, a text messaging application, a social networking application, a location application, or a combination thereof). From the perspective of the user, a polymorphic note can be thought of as an event, a task, a simple reminder, etc. that is able to evolve into other objects of a different application type or even a combination of application types based on how the information within the polymorphic note develops over a period of time.

Figure 1:
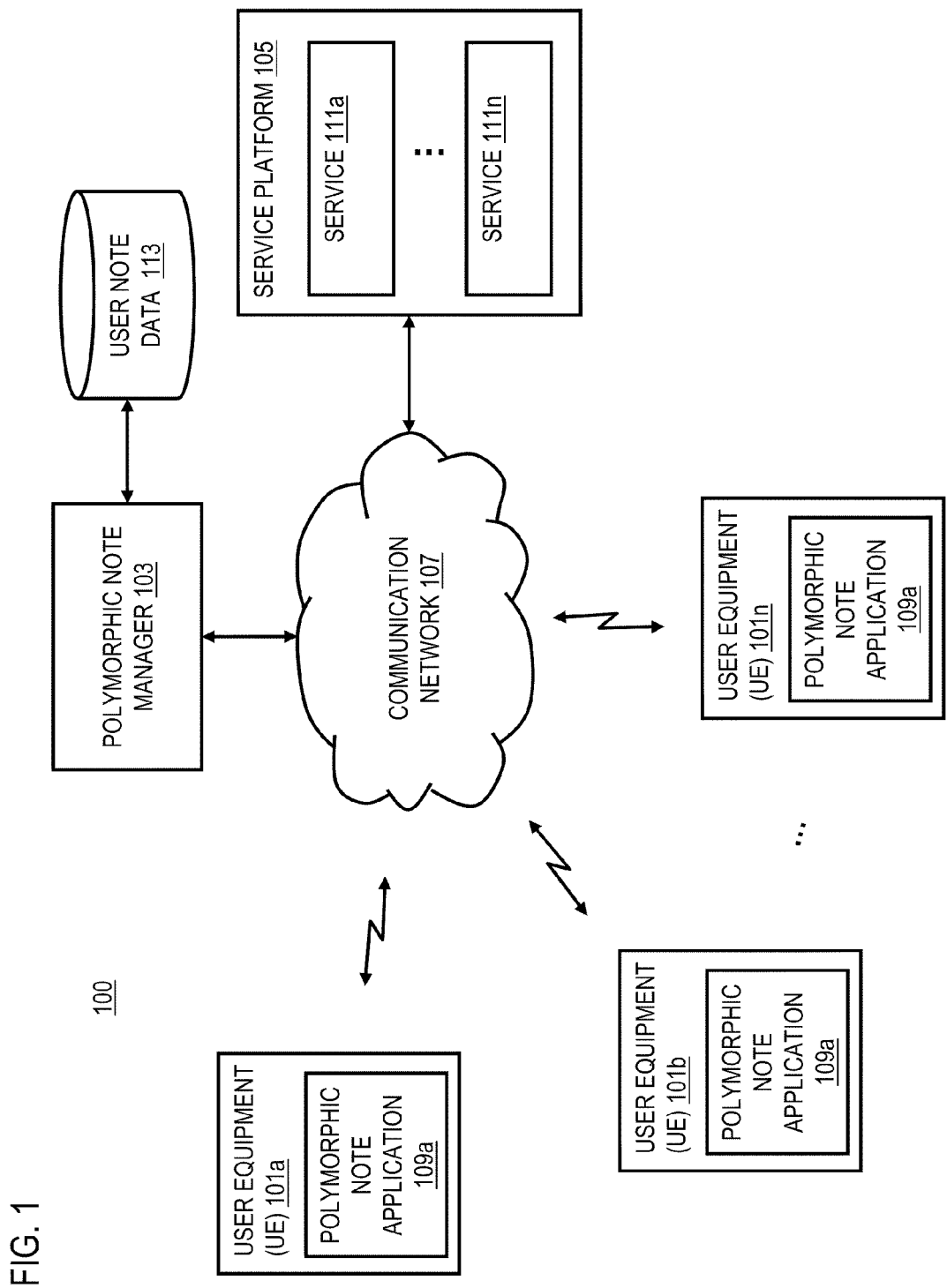
FIG. 1 is a diagram of a system capable of generating a polymorphic note, according to one embodiment.

FIG. 1 is a diagram of a system capable of generating a polymorphic note, according to one embodiment. It is noted that there are numerous traditional electronic personal information management (PIM) solutions (e.g., calendaring applications, task management applications, etc.) for organizing a user's life available on the market. However, outside of business uses, there has been relatively little adoption or use of these traditional PIM solutions compared to e-mail, instant messaging, and other similar tools. This lack of adoption can be attributed, at least in part, on the fact that personal organizing often begins with potential events, fuzzy timeframes, and long-term goals. As users interact, these events, timeframes, and goals evolve into a more concrete form. Even then, this form can keep changing up to, during, and even after the event. Once an event has occurred, the planning documentation itself acts as a record of the vent that provokes memories and inspires future actions and events.

Moreover, users generally have their own complex organizational methods that are very personal and intuitive. These methods typically have not been supported by traditional PIM solutions, which require discrete up-front knowledge of what and when with regards to an event or goal before considering who or where. Under traditional approaches, little or no support exists for incorporating possible alternatives to events or ambitions that are not tied to a specific time (e.g., a general ambition to "get more exercise" with no specific accompanying details). In other words, a user has to know exactly what the user wants to do and when the user wants to do it before the user can even start creating or recording an event in a traditional PIM application or solution. The regimented and inflexible approach of traditional PIM solutions does not reflect how most people actually plan events or goals that build on an initial (often fragmented) idea. If a user wants to initiate an event with just a thought, the user is generally limited to recording the thought in a memo or task that is stranded in its own tool or application. When the thought becomes more concrete, there is typically no easy or automated way to transfer the information recorded in the memo or task to, for instance, a calendaring application. Because these PIM solutions do not meet the full spectrum of user needs, adoption of existing tools is limited primarily to specific segments of users' lives (e.g., most often as a tool used only for work).

To address these problems, the system 100 of FIG. 1 introduces the capability to generate a polymorphic note to enable a user to record events, tasks, and other information whose details range from being concrete to ambiguous. It is noted that although several embodiments of the invention are discussed with respect to a user initiating or requesting the creation of a polymorphic note, it is recognized by one of ordinary skill in the art that the embodiments of the inventions have applicability to any entity (e.g., both users and non-users of the note) for initiating the creation of the note. For example, a service provider, network operator, content provider, and the like may create a note for users. In particular, a service provider may, for instance, create polymorphic notes as a way of communicating to all or some groups of users (e.g., communicating service updates, new functionalities, marketing information, etc.). Also, a service, service provider, or other authorized entity may create notes on behalf of the user, for instance, based on the user's usage behavior other pattern.

In the approach described herein, the polymorphic note of the system 100 supports the capability of recording the fluid evolution of idea or concept into an event, task, or other similar PIM element or information, thereby enabling users to record their ideas and plan events in a more natural and evolutionary way. By providing a single object (i.e., the polymorphic note) that can fulfill the purposes or historically separate objects, the system 100 advantageously enables a more natural progression from a simple idea (e.g., a textual note) to a list of things to do next (e.g., a task) to a scheduled happening (e.g., a meeting, a social event, etc.) alone or with one or more friends. By way of example, planning an event is dynamic in which various options are considered from multiple sources and plans continue to evolve up to and even during an event. Moreover, it is rare for only one person to be involved in developing a plan. Coordinating events between two or more people is observed to be a highly iterative and disjointed process. This is especially true for information events which can start with a casual comment between two people and evolve into a planned event among many people. The constant conversation and coordination revolving around the event can cause it to gain momentum and become even more significant. There typically is no formal planning process for these types of casual events, and one is often not desired. Instead, what many users want is a cohesive history of the conversation building to the event that can span time, variable amounts of people, and multiple communication tools such as phone calls, text messaging, instant messaging, e-mail, and the like. The system 100 enables sharing of the polymorphic note among a group of users to record and leverage this type of group dynamic.

The time-critical factor among plans can vary widely and also affect the development of an idea or plan. For example, time spans associated with an idea or event can range from "I have a meeting in five minutes" to "I want to go to Australia this summer" to "I want to go skydiving someday." In fact, some plans cannot or are not tied to a specific time. The flexible nature of the polymorphic note enables the note to capture any of these time frames within a common object construct.

In a sample use case, a user is in constant contact with her friends via a shared polymorphic note. The user and her friends are planning to attend meet up at one of the many parties to which they have been invited on a Saturday night. The user receives an update to the shared polymorphic note and sees that one of her friends is suggesting a particular party. The user and her friends vote on whether to attend the suggested party and arrange to meet at the party at a particular time based on the vote. Both the vote and the resulting scheduled meeting time is facilitated by and recorded in the polymorphic note. In one embodiment, the vote may include an indication of the time the user will join the resulting scheduled meeting. The users can come to the meeting/event at different times during the meeting/event; the arrival times can be noted or recorded in the polymorphic note. Moreover, the user can give a partial acceptance, e.g., arriving 10 pm or arriving 11 pm and departing 12 pm, etc. All of this information may be presented to users via the polymorphic note.

As evident in the sample use cases above, the polymorphic note is a highly interactive and potentially constantly changing information object. Multiple users (e.g., the creator of the polymorphic note and other authorized users) may access and update information (e.g., provide commentary, suggest new ideas, etc.) in the note at any time. These updates may lead to a torrent of information for the users to follow. This problem of information overload can be even more problematic as users create and share multiple polymorphic notes on any number of topics. For example, it is noted that users of traditional PIM applications when confronted with too much information often become jaded to the constant stream of alerts and reminders sent from the applications. After a period of time, the information from such PIM solutions are no longer used and provide little value to the user.

To address this additional problem, the system 100 introduces the capability to organize and present a collection of polymorphic notes to a user based on their relevance to the user. In other words, at any particular time, the system 100 presents and emphasizes those polymorphic notes in, for instance, a graphical user interface that are likely to be more relevant to the user based on contextual information (e.g., time, location, people, status, etc.). More specifically, the system 100 organizes the presentation of polymorphic notes according to a loose chronological order by the date and time associated with each polymorphic note or by the creation date of the polymorphic note if no date and time is associated with the note. In this way, the system 100 may still provide a linear timeline or "notestream" of polymorphic notes even when one or more of the notes have no specific date. For example, the user may create a polymorphic note to capture the idea that "I want to go sailing". Although no specific date is specified for this idea, the date the idea was captured and created in a note may nonetheless provide context for the idea in relation other notes or events occurring with respect to the user. With traditional PIM solutions, undated items are typically lumped together in one section. In one embodiment, even though "I want to go sailing" has no exact time mentioned at all and, therefore, can be easily overlooked, the system 100 provides for display of notes with common attributes. As a result, a note which has at least one common aspect about sailing may link the "I want to go sailing" not, causing the note to be displayed along with other related notes. In this way, the system 100 advantageously provides additional opportunities for notes to be displayed and avoid being "forgotten".

As shown in FIG. 1, the system 100 comprises user equipment (UEs) 101a-101n having connectivity to a polymorphic note manager 103 and a service platform 105 via a communication network 107. In one embodiment, the polymorphic note manager 103 facilitates the generation of a polymorphic note to record user events or other similar PIM related information over, for example, a period of time. The polymorphic note manager 103 also facilitates the subsequent access and/or manipulation of the polymorphic note by a polymorphic note application (e.g., polymorphic note applications 109a-109n) executed by the UEs 101a-101n or by one or more of the services 111a-111n of the service platform 105. In one embodiment, the services 111a-111b include a suite of services such as a location management service (e.g., a mapping service or navigation service), contact management service, messaging service, social networking service, media content service (e.g., music service, video service, etc.). In another embodiment, the polymorphic may contain triggering information (e.g., time, people, place, etc.) to initiate corresponding actions or functions provided by the polymorphic note manager 103, the services 111a-111n, and/or any other services available over the communication network 107. In addition or alternatively, the polymorphic note manager 103 may operate a web server to facilitate access to and/or manipulation of the polymorphic note using a web browser (not shown) executed on one or more of the UEs 101a-101n. In this way, the UEs 101a-101n need not execute a polymorphic note application 109 to access the functions of the polymorphic note manager 103.

In one embodiment, the polymorphic note manager 103 generates a polymorphic note that includes information of a plurality of application types in which the information is developed or evolved over period of time. The polymorphic note manager 103 stores the information in, for instance, the database 113 of user note data. In addition or alternatively, the user note database 113 can reside on one or more nodes connected directly or indirectly to one or more of the services 111a-111n. In other embodiments, the user note database 113 resides one or more nodes in the network 107. More specifically, the user note database 113 includes one or more processes (not shown) and one or more data structures that store polymorphic notes and related information as well as data, configurations, user profiles, variables, conditions, and the like associated with operation of the polymorphic note manager 103 and/or the polymorphic note applications 109a-109n. The note generator module 203 may also organize any generated polymorphic notes into one or more electronic notebooks. These notebooks can then be shared among one or more other users so that the other users can collaborate in developing the polymorphic note as described previously. By way of example, the notebooks may be assigned attributes (e.g., work, home, personal, private, etc.) that direct how and to whom the notebook is shared. The users can view these notebooks of polymorphic notes and/or the polymorphic notes themselves in, for example, a contextually based graphical user interface.

Figure 10:
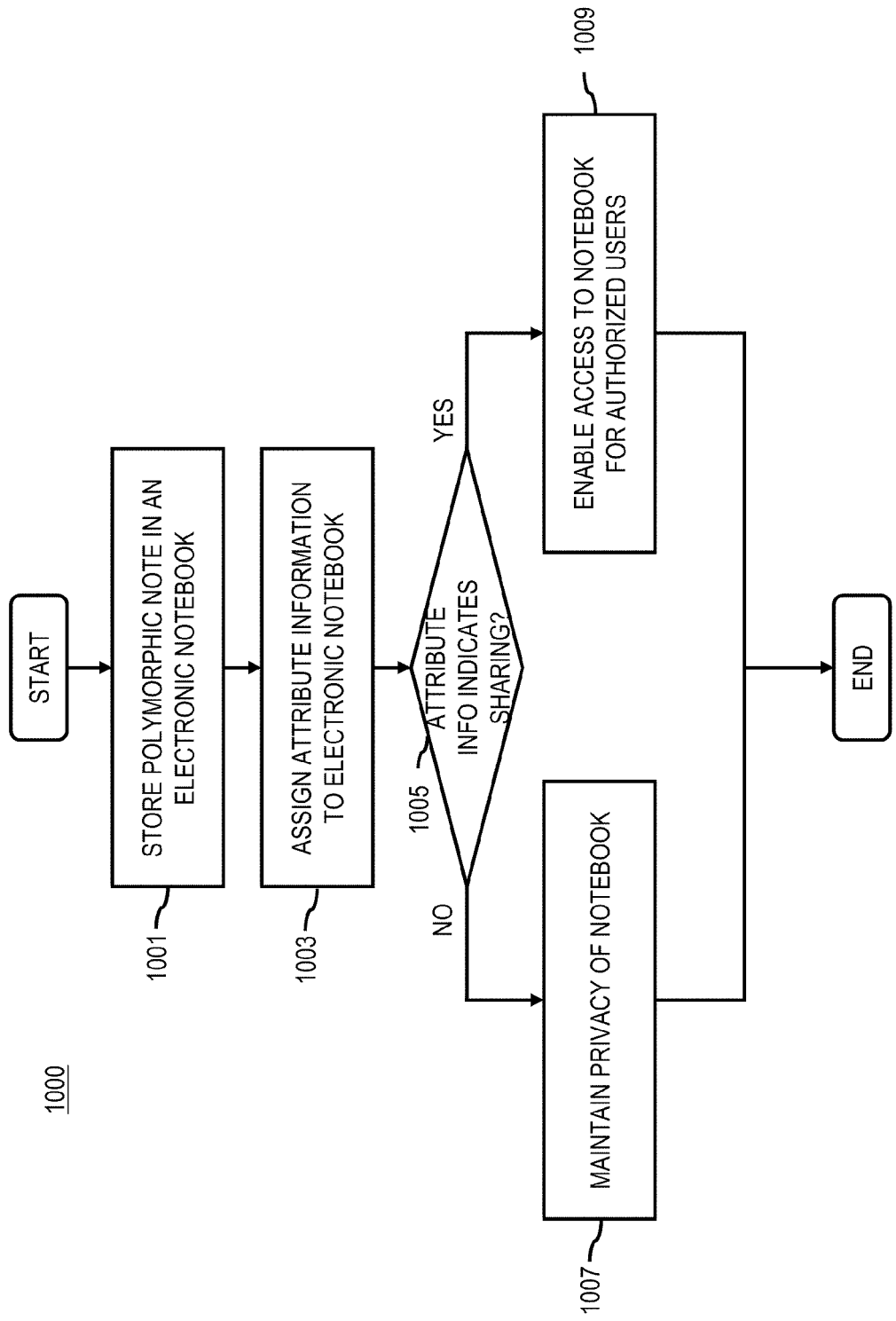
FIG. 10 is a flowchart of a process for storing and sharing a polymorphic note in an electronic notebook, according to one embodiment.

In one embodiment, the polymorphic note manager 103 and the service platform 105 can be implemented via shared, partially shared, or different computer hardware (e.g., the hardware described with respect to FIG. 10).

By way of example, the communication network 107 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UEs 101 are any type of mobile terminal, fixed terminal, or portable terminal including a mobile handset, station, unit, device, multimedia tablet, multimedia computer, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 may also be equipped with one or more sensors (e.g., a global positioning satellite (GPS) sensor, accelerometer, light sensor, etc.) for use with the services 111a-111n.

By way of example, the UEs 101, the polymorphic note manager 103, and the service platform 105 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the polymorphic note application 109a and the polymorphic note manager 103 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. In one embodiment, the server is integrated as part of the client.

Figure 2:
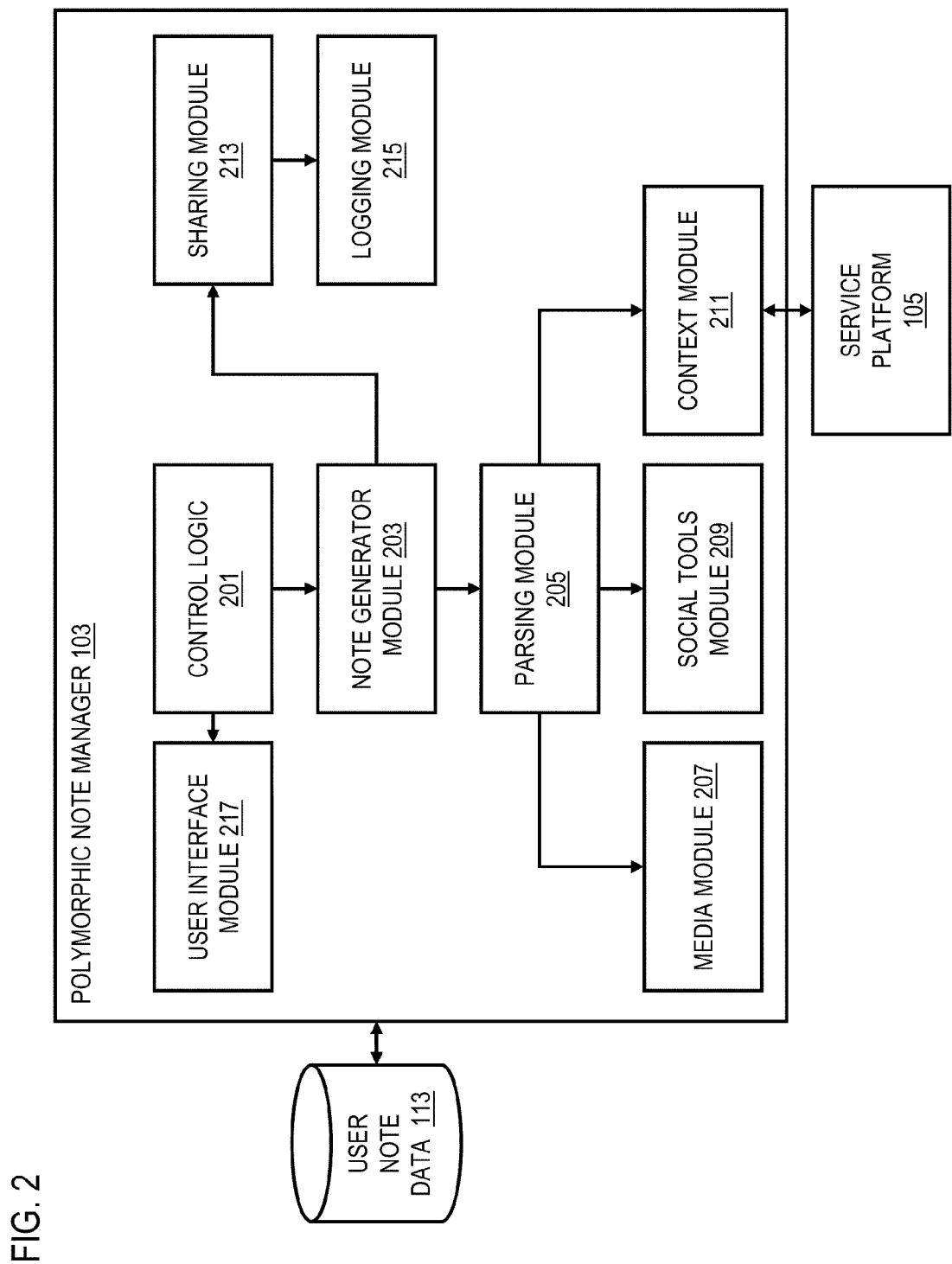
FIG. 2 is a diagram of components of a polymorphic note manager, according to one embodiment.

FIG. 2 is a diagram of components of polymorphic note manager, according to one embodiment. By way of example, the polymorphic note manager 103 includes one or more components for generating, sharing, and updating a polymorphic note. It is contemplated that the functions of these components may be combined in one or more components or performed by other components of equivalent functionality. In this embodiment, the polymorphic note manager 103 includes at least a control logic 201 which executes at least one algorithm for executing functions of the polymorphic note manager 103. For example, the control logic 201 interacts with the note generator module 203 to receive a request, from a user, to generate a polymorphic note. The request can be initiated via the polymorphic note application 109 or via a web portal provided of the polymorphic note manager 103 by initiating a command to create a new polymorphic note. In one embodiment, the new polymorphic note may be created as a blank note or as a duplicate of an existing note that can then be edited.

It is contemplated that the request can include any amount or specificity of information to initiate the creation of a polymorphic note. In the example of FIG. 2, the note generator module 203 interacts with the parsing module 205 to analyze any textual input that may have been provided in the request to determine at least a part of the information to include in the polymorphic note. More specifically, the parsing module 205 enables input of information using free-form text input. For instance, a user can simply type "Meet with Steve at 6 pm next Thursday at Molly McGees," resulting in the parsing module 205 creating a meeting at 6 pm next Thursday with the location "Molly McGees." The parsed results can then be presented to the user for confirmation and/or correction. In addition or alternatively, the note generator module 203 can present the user with a traditional input selection form to provide information for inclusion in the polymorphic note. The note generator module 203 may also determine whether any common attribute or information (e.g., event time, location, etc.) is missing from the information provided in the initial request and prompt or provide a reminder to the user that the information is missing (e.g., "Please set a start time for your event"). In one embodiment, the request to create the polymorphic note can be indicated by non-textual means. For example, the user can initiate a request by pointing out a location (e.g., a point of interest (POI)) on a digital map. The specified map location will then mean, for instance, the location of the event described in the polymorphic note.

Next, either the note generator module 203 or the parsing module 205 can interact with the media module 207, social tools module 209, and/or context module 211 to supplement the information included in the polymorphic note. The media module 207, for instance, enables the insertion or attachment or linking of media (e.g., audio, video, etc.) and/or document files to the polymorphic note. Once the media content is inserted into the polymorphic note, the media content effectively becomes a part of the polymorphic note and is transported (e.g., transmitted or copied to another UE 101 or node of the network 107) as a unit with the polymorphic note until the media is otherwise removed.

In embodiment, the social tools module 209 enables the addition any number of social tools to any polymorphic note. Examples of social tools are a blog-like conversation thread, multiple choice voting, shared tasks, commenting, etc. For example, each of the social tools enables multiple users to interact with or express comments about the information in the polymorphic note. These interactions and/or comments can be recorded in the polymorphic note. In one embodiment, the social tools and information included in a polymorphic note may be different or presented differently depending on the intended recipients of the note, e.g., family members may not need as much information as business associates or vice versa when they are invited to the same party. Accordingly, the user, when requesting generation of the polymorphic note, can specify what information is displayed depending on the intended recipients.

The context module 211 enables the polymorphic note manager 103 to automatically determine attributes (e.g., location, people, time, etc.) of the polymorphic note that can be retrieved from either one or more of the services 111 of the service platform 105 and/or a sensor included in the UE 101 associated with the user. By way of example, place attributes can be set via navigation of places specified in the user's contact list or through a maps database or determined by a location-based sensor (e.g., GPS satellite receiver). In this case, the user can select or enter a location for recognition by the context module 211. It is contemplated that the polymorphic note may be associated with any number of locations.

Similarly, people attributes can be set through selection from the user's contact list or a public directory. In another embodiment, the user may begin typing the names of people to associate with the polymorphic note. The context module 211 can then match the typed name against the user's contact list or public directory to specify the name. It is contemplated that the user can associate any number of names with the polymorphic note. The time attributes can be set via traditional calendar views or a clock of the UE 101.

After generating the polymorphic note, the polymorphic note manager 103 interacts with the sharing module 213 to share the polymorphic note with other users. In the approach described herein, individual polymorphic notes as well as notes aggregated in electronic notebooks may be shared. Sharing can be "read only" (e.g., other users can view but not edit the data) or "read/write" (e.g., other users can edit any attribute or information in the polymorphic note). In one embodiment, the owner or creator of the note can share a note. If the note creator shares a note and then deletes it (or unshares it), the recipients receive, for instance, notification of the deletion or unsharing. In certain embodiments, the sharing module 213 will ask whether the recipient would like to make a local copy of the shared polymorphic note, which creates a static snapshot of the note for the recipient. This local copy is no longer linked to the original polymorphic note. The copying is offered because having a creator delete a note might be unnerving to the recipient if the recipient added information to the note, wanted to keep a record of the note contents, etc. If a recipient is removed from sharing a note, creates the recipient's own copy, and is later added back to the sharing the same polymorphic note, the sharing module 213 can offer to merge the local copy into the original note. In one embodiment, a note or notification of a note that is no longer more valid may disappear from the recipient's notes display (e.g., on a the recipient's device) after a predetermined validity time has expired. The expiration may be determined, for instance, by comparing the time of validity to the clock of the user's device. It is noted that the note is only removed from the display note from memory; the note can still be accessed or linked to other notes if needed based on the dependencies between the notes.

In addition, UEs 101 associated with the users of the polymorphic note can be temporarily disconnected from the network 107, therefore, local copies of the polymorphic note are often edited and synchronization conflicts can arise. In embodiment, the sharing module 213 handles the synchronization and synchronization conflicts. If a user encounters synchronization conflicts with the user's own notes (e.g., when editing a polymorphic note through both the web portal and a disconnected mobile device such as a handheld mobile computer and then reconnecting the mobile device), the user is prompted directly as to how to resolve the conflict or discrepancy (e.g., asked which version to accept).

However, in the social setting of shared polymorphic notes, conflicts can be resolved differently. Upon information conflicts or discrepancies caused by different users, the users causing the conflict are presented with options to (socially and gracefully) resolve the conflict, including contacting each other directly (with contact information), adding to the polymorphic note's conversation thread, and/or making a personal copy of the polymorphic note to save changes.

As shown, the sharing module 213 has connectivity to the logging module 215. The logging module 215 operations to record updates to the polymorphic note by the owner or other users of the polymorphic note. In one embodiment, the logging module 215 also records information related to use of any of the social tools included in the polymorphic note. For example, this information includes results of voting, comments, status of shared tasks, etc.

In yet another embodiment, the control logic 201 interacts with a user interface module 217 to present the polymorphic notes stored in the user note database 113 in a navigable timeline or notestream view. By way of example, the user interface module 217 retrieves information for the user note database 113 to order the polymorphic notes according the loose chronological order discussed above. In some embodiments, the polymorphic notes are stored in the user note database 113 according the loose chronological order, and the user interface module 217 need not perform the ordering. The user interface module 217 may also evaluate context information associated with the polymorphic note to determine the relevance of the notes with respect to a particular user and then direct the display of the most relevant notes to the user in the timeline. In another embodiment, the user interface module 217 can highlight or mark one or more of the polymorphic notes in the graphical user interface according to user-specified attributes (e.g., shared notes or notes that the user considers notable).

Alternatively, users may access the functions of the polymorphic note manager 103 via an access control application (e.g., the polymorphic note application 109) in the UE 101 such as a widget, according to another embodiment. Widgets are light-weight applications, and provide a convenient means for presenting information and accessing services. It is contemplated that the functions of these components may be combined in one or more components or performed by other components of equivalent functionality. In this embodiment, the polymorphic note application 109 includes modules similar to those of the polymorphic note manager 103, as previously described. To avoid data transmission costs as well as save time and battery, its control logic can fetch polymorphic note data cached or stored in its own database, without requesting data from any servers or external platforms, such as the polymorphic note manager 103 or the service platform 105.

Figure 3:
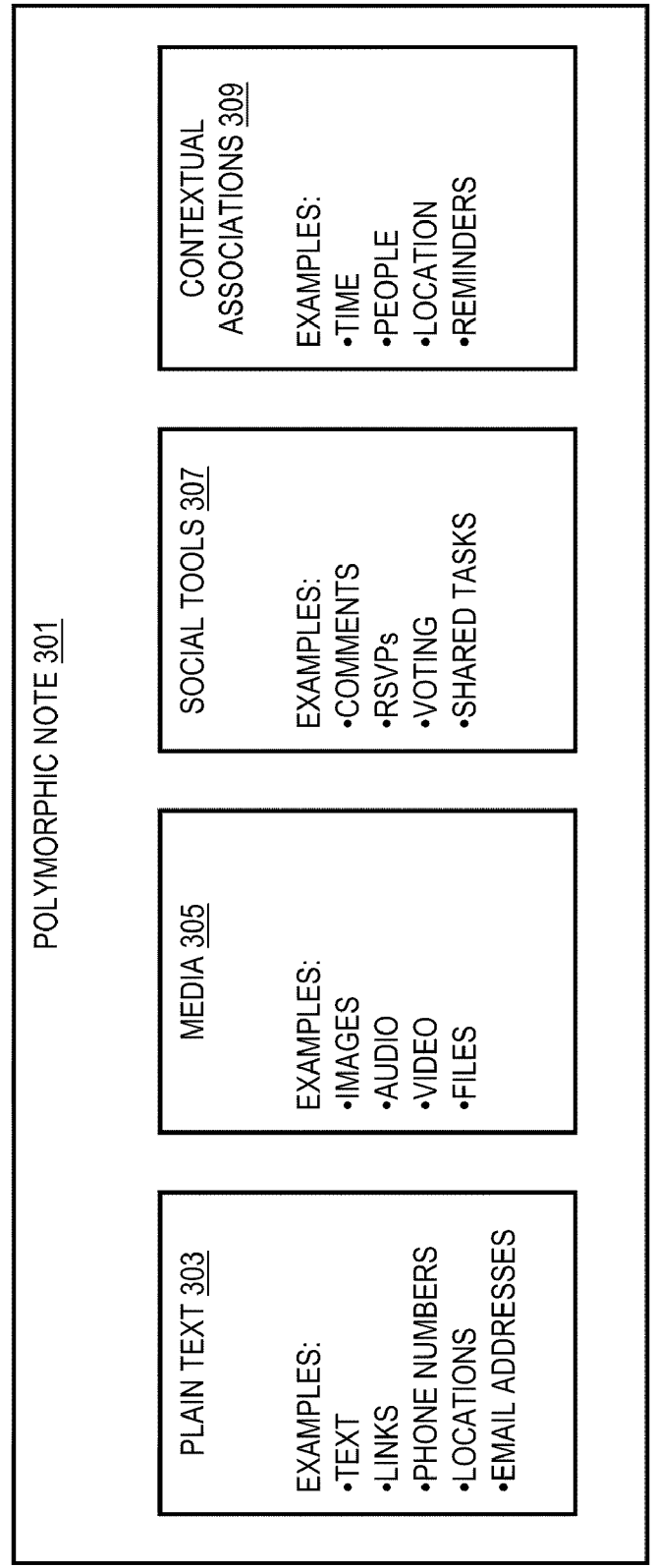
FIG. 3 is a diagram of components of a polymorphic note, according to one embodiment.

FIG. 3 is a diagram of components of a polymorphic note, according to one embodiment. As shown in FIG. 3, a polymorphic note 301 includes four main sections: (1) a plain text section 303, (2) a media content section 305, (3) a social tools section 307, and (4) a contextual associations section 309. The plain text section 303 includes text input specified by users of the polymorphic note. As described previously, the text input is parsed to identify information such as web links, phone numbers, locations, e-mail addresses, and the like. The parsed information can then be used to determine one or more attributes (e.g., data elements) of the polymorphic note.

The social tools section 307 provides features to make polymorphic notes a social experience. For example, the social tools section 307 provides for a range of social interactions including commenting functions whereby users of the polymorphic note can provide commentary on any topic supported by the polymorphic note. The commentary can then be viewed by other users and included as part of the logged history of the polymorphic note for later access. The section 307 also provides for a structured task list for assigning tasks to one or more users of the polymorphic note. The polymorphic note can then document the assignments and completion status of the tasks. An example of another social tool is a voting or polling function which enables multiple people to set up a vote of any topic of interest (e.g., where to go for lunch, meeting dates and times, favorite actor, etc.). Yet another social function is the RSVP list which shows response of users who have been invited to a particular event.

The contextual associations section 309 enables the polymorphic note manager 103 to associate information such as time, people, location, reminders, and status with the polymorphic note. For example, with respect to time, the polymorphic note manager by default associates the creation time with polymorphic note. If a user of the polymorphic note sets a specific time (e.g., a start time, duration, end time, etc.), the set time replaces the default creation time. As described earlier, people and location can be obtained from sensors of the UE 101 or from one or more services 111 related to the contextual association. In one embodiment, the notes may be linked with each other so that the notes form a journey or chain. In one embodiment, the polymorphic note manager 103 will suggest a link between two or more notes depending on, e.g., the relevancy or similarities of the notes.

With respect to reminders, user can associate one or multiple reminders to a note. These reminders can then appear online via the web portal or on the UE 101 of the user via the polymorphic note application 109. By way of example, the type of reminder that is presented depends on the type of associations the user has added to the note.

In one embodiment, polymorphic notes have both "private" attributes that only the note creator or owner can view and edit, as well as "public" attributes that are viewable and sometimes editable by others through note sharing. By way of example, private attributes include the name of the notebook in which the polymorphic note is stored (e.g., see discussion of notebooks with respect to FIG. 4 below), personal flags, soft and hard reminders. Public attributes include the note title, the note body (which can contain text, clickable URLs, pictures, video clips, audio clips, and links to other notes), a variety of social tools (including voting for several options, RSVP, checklists, conversation thread, etc.), and a revision history (which anyone can view, but only the note creator can "undo" to a certain point in the history).

In another embodiment, polymorphic notes can be formatted and/or skinned. The note body allows, for instance, font color/family/size and similar common text formatting, background color and/or image, similar visual formatting. By way of example, an image of the location or POI associated with a polymorphic note can be used as a background for the note. This image may be obtained from, for instance, a mapping service of the service platform 105 or from a picture collection of the creator of the note. In yet another embodiment, the picture or formatting theme of the note may be selected to reflect advertising, marketing, branding, or other similar purposes. Users can create a blank note, apply formatting, and then save the note as a new formatting note "template," for easy application to other notes in the future. In one embodiment, this appropriate template to apply to a new note can be determined based on the contextual information of the new note. For example, if one or more key words associated with the new note matches an existing template, the missing information for new note can be taken or suggested from the template. The suggested information can be edited according to the needs of the new note.

Figure 4:
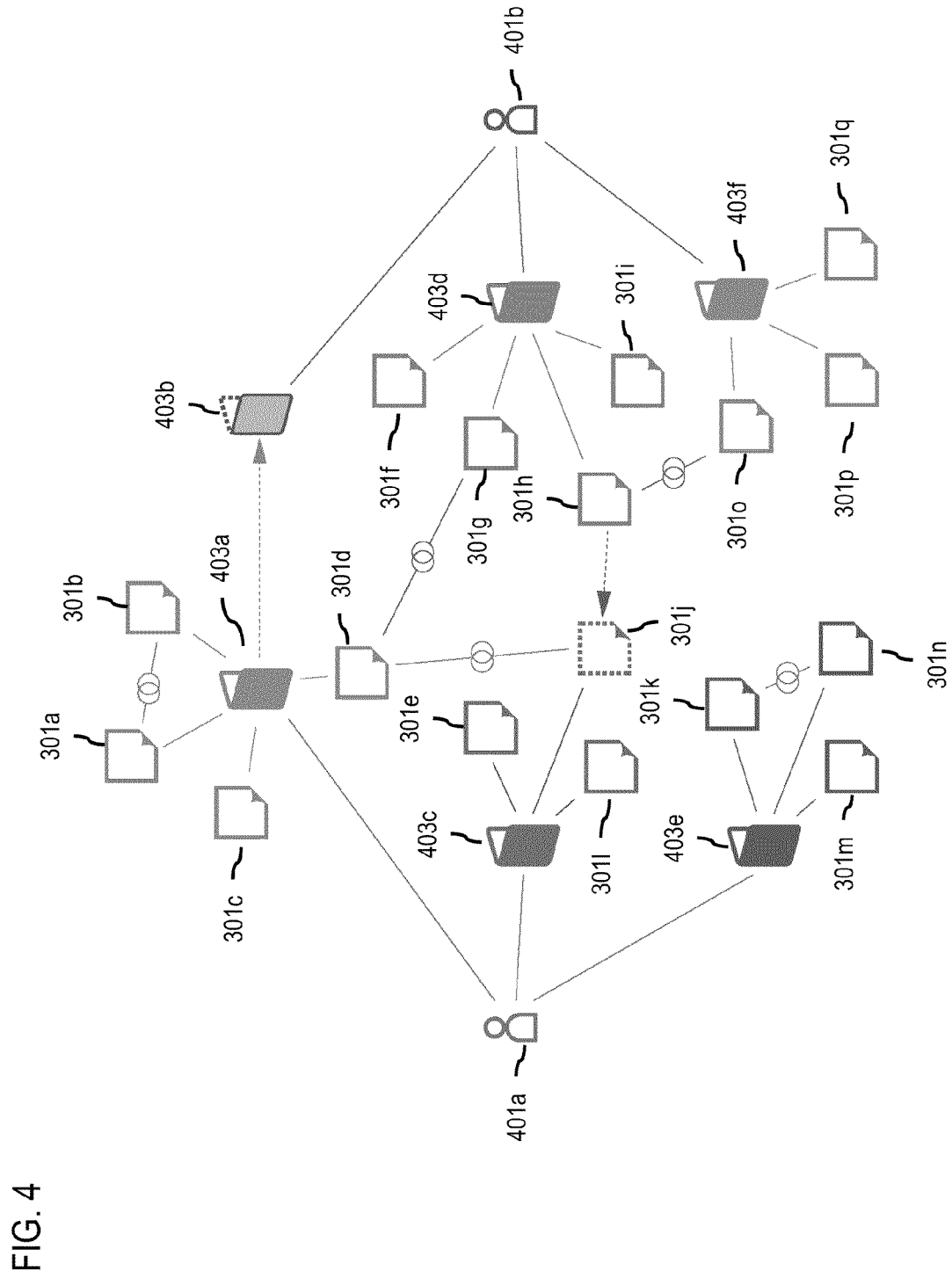
FIG. 4 is a diagram illustrating organization of a plurality of polymorphic notes into electronic notebooks, according to one embodiment.

FIG. 4 is a diagram illustrating organization of a plurality of polymorphic notes into electronic notebooks, according to one embodiment. As shown in FIG. 4, polymorphic notes may be grouped into notebooks, which, in one embodiment, are the primary organizational tool available to users. Notebooks service three primary functions: (1) separations of polymorphic notes for sharing (or isolating), (2) managing subscriptions to indicate what polymorphic notes are shared with particular users, and (3) arbitrary organization of polymorphic notes.

In one embodiment, for each user, a polymorphic note exists in one notebook. Users may have multiple notebooks including predetermined default notebooks if needed. Notebooks also have certain attributes that can be easily changed such as the list of users sharing the polymorphic note can be easily changed or a default display theme. For example, a user 401a can have a notebook 403a for the user's work calendar, a notebook 403c for family organization, and a notebook 403e for the local sports calendar. This organization scheme enables the user to easily sort the user's notes and focus on the items of most interest or importance.

In addition, notes (e.g., notes 301a-301b) can be linked to each other to provide an explicit relationship between them and to facilitate easy navigation between them and/or indicating sequence of the notes. Linking (e.g., indicated by the lines with a double circle) is independent of the notebooks 403a-403f, and any two notes 301 may be linked, though only two notes 301 may be associated with any single link.

For example, if a user decides to create a note for a birthday party and invite friends to it, she can then create a related note 301 to remind her to bake a cake and to shop for ingredients of the cake on time, and another related note 301 to remind her to talk to a friend about buying a birthday present. This way she can easily hop between the related notes 301 while she is thinking about them without sending all of this information along with the invitation.

In one embodiment, both the notebooks 403 and the linking are personal and are not shared, with the exception of the shared notebook 403a/403b. In this case, all notes 301 within a shared notebook 403a are seen within the shared notebook 403a by all parties sharing the notebook 403a. In another embodiment, if a user has had individual notes 301 from a notebook shared with him, then the entire notebook 403 is shared. A prompt asks, for instance, if the user would like to move all existing notes from that notebook 403 into the now-shared notebook 403.

Figure 5:
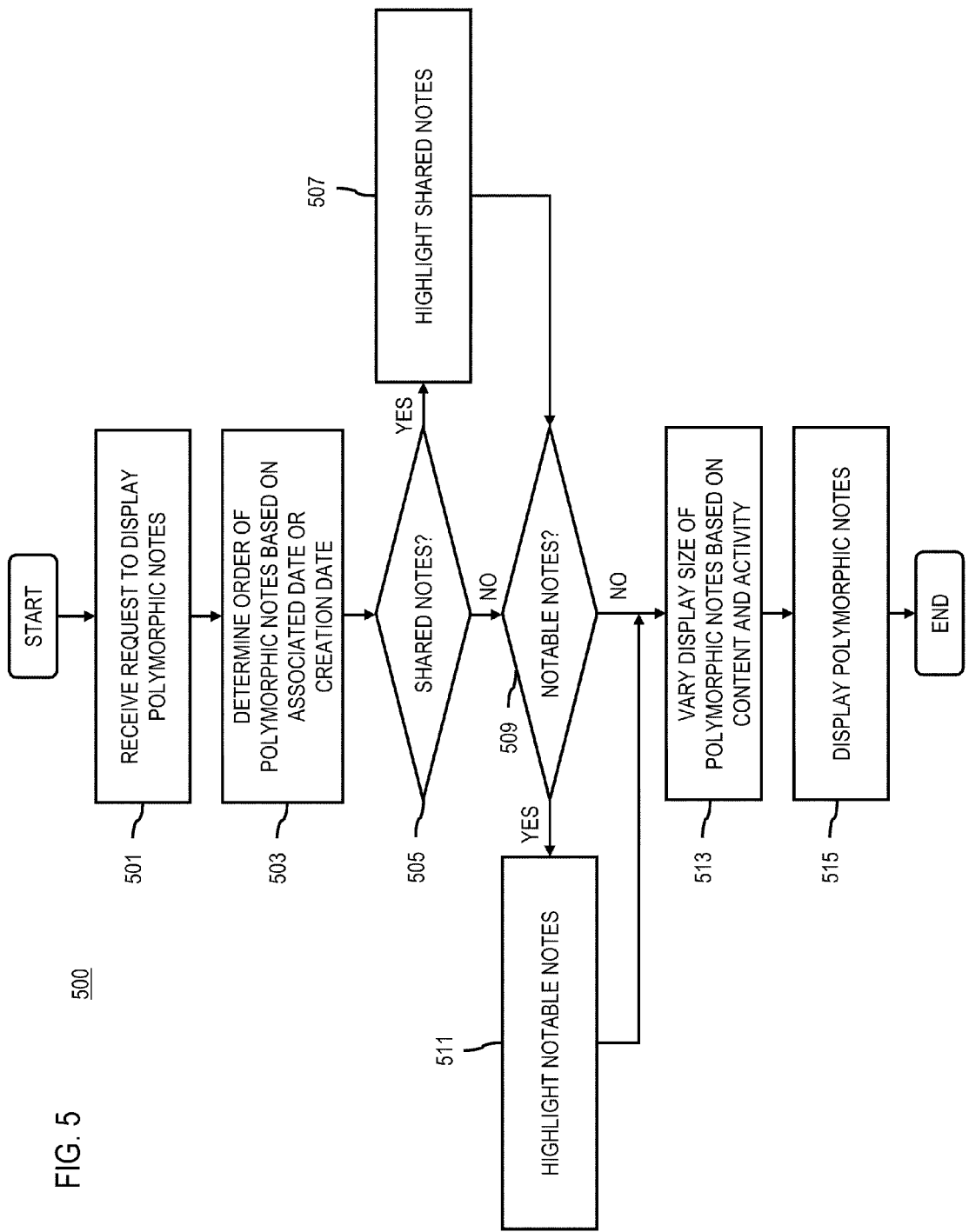
FIG. 5 is a flowchart of a process for presenting polymorphic notes in a graphical user interface, according to one embodiment.
Figure 15:
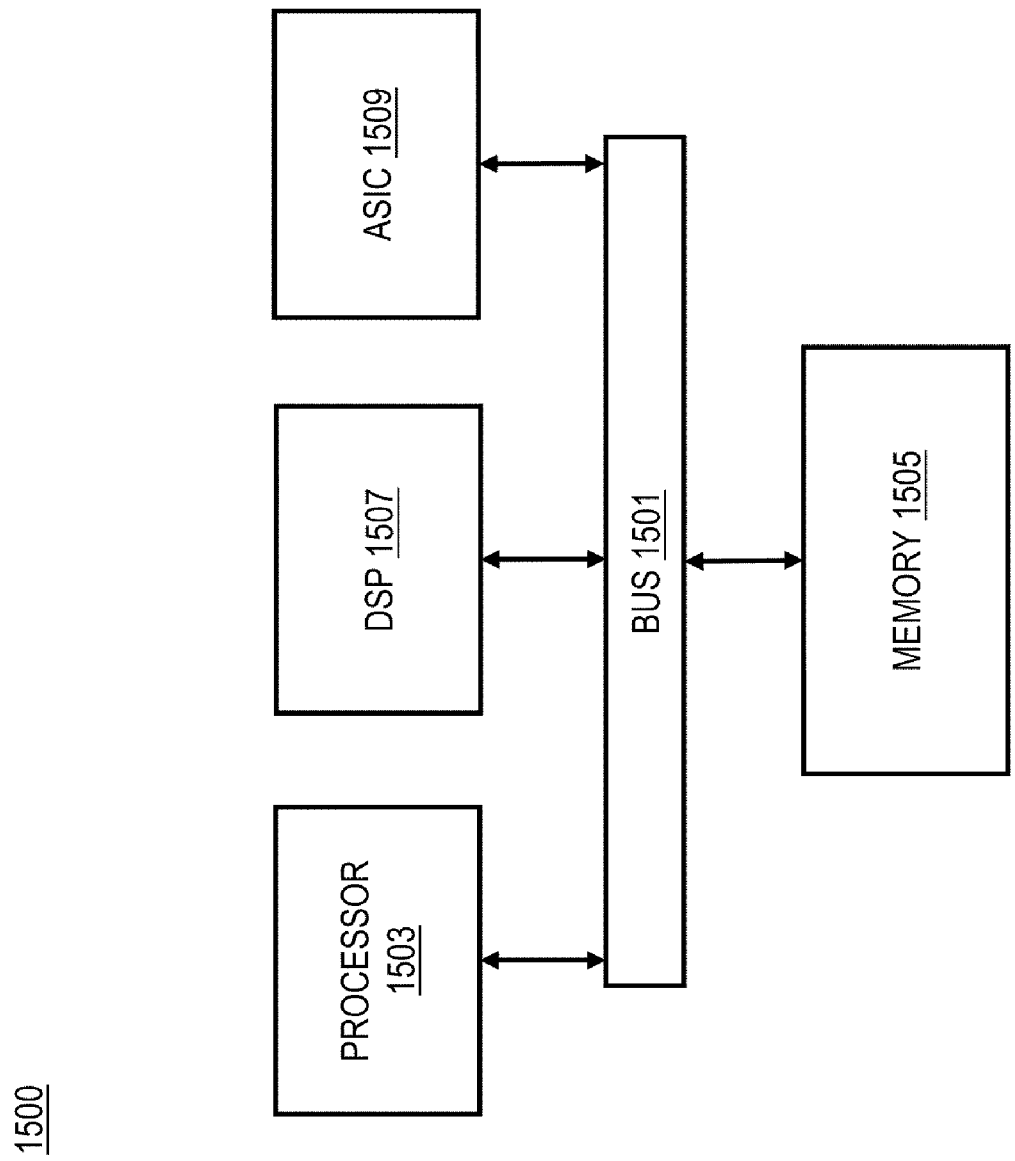
FIG. 15 is a diagram of a chip set that can be used to implement an embodiment of the invention.

FIG. 5 is a flowchart of a process for presenting polymorphic notes in a graphical user interface, according to one embodiment. In one embodiment, the polymorphic note manager 103 performs the process 500 and is implemented in, for instance, a chip set including a processor and a memory as shown in FIG. 15. The process 500 assumes that at least one or more polymorphic notes have been created according to the processes for generating a polymorphic note described below with respect to FIGS. 9-13B. In step 501, the polymorphic note manager 103 receives a request to display one or more polymorphic notes on a graphical user interface of a UE 101 associated with a requesting user. This request may be initiated, for instance, via the polymorphic note application 109 executed on the UE 101 or a web portal of the polymorphic note manager 103 by selecting a command to display the graphical user interface.

The polymorphic note manager 103 then determines an order for displaying the polymorphic notes according a loose chronological order (step 503). The loose chronological order reflects the inherent flexibility of the polymorphic note that enables the user to record a variety of information including information without a specific date. As used herein, the term loose chronological order is used to refer to an order of the polymorphic notes that is specified according to either a date associated with the notes or a creation date of the notes if there is no associated date. In certain embodiments, a last revised date can be used in place of the creation date when there is not date associated with a polymorphic note. In addition or alternatively, the polymorphic note manager 103 may provide the option for the user to specify the ordering method (e.g., by associated date, creation date, revision date, etc.). This hybrid approach enables all notes to be attached with a date for display on timeline. The date information is stored, for instance, in either the note itself or in meta-data associated with the date. For example, when a user creates or revises a note the polymorphic note manager 103 generates a time stamp and associates the time stamp with the polymorphic note. As new polymorphic notes are created, the new notes can be inserted in the determined order or the timeline based on the ordering scheme described above.

Next, the polymorphic note manager 103 determines whether any of the polymorphic notes to display match specific attributes for highlighting in the graphical user interface. In one embodiment, the polymorphic note manager 103 highlights: (1) notes that are shared with or by other users and (2) notes that are designated as notable by the user. Accordingly, in step 505, the polymorphic note manager 103 determines whether any of the notes that are to be displayed are shared. For example, the polymorphic note manager 103 retrieves information regarding each polymorphic note from the user note database 113 to determine whether the creator or the note has designated the note for sharing. In one embodiment (e.g., as described below with respect to FIG. 10), the sharing determination is made by querying whether the polymorphic note is organized in a notebook that includes an attribute for sharing. If the polymorphic note is shared, the graphical representation of the note is highlighted or otherwise marked to indicate its shared status (step 507). In one embodiment (see, e.g., FIG. 8 which depicts an example graphical user interface), the note is designated with an icon to indicate its shared status. It is contemplated that the polymorphic note manager can use any mechanism (e.g., color, graphics, animation, audio alerts, etc.) to indicate the shared status.

If the the polymorphic note is not shared, the polymorphic note manager 103 next determines whether the polymorphic note has been designated as notable by the user (step 509). In addition or alternatively, the polymorphic note manager 103 may also determine whether the note has been marked as notable by another user of the polymorphic note. In this case, the polymorphic note manager 103 may differentiate the highlighting based on which user has designated the note as notable (e.g., a different icon or color for each respective user). If the note has been designated as notable, the polymorphic note manager 103 highlights the polymorphic note using the process described above for marking the shared status of note (step 511) with the exception that the highlighting or other marking is specific to the notable status.

The polymorphic note manager 103 may continue marking and highlighting the notes based on additional attributes (e.g., user-defined categories such as home, work, personal, etc.) until all such attributes have been highlighted. It is contemplated that each polymorphic note may be designated and highlighted using any number of attributes or classifications for easy identification in the graphical user interface. In certain embodiments, the highlighting may be performed according to predetermined themes which specify common graphical elements, styles, colors, etc. to use in rendering the graphical user interface.

In step 513, the polymorphic note manager 103 determines the appropriate display size of each polymorphic note. In one embodiment, the size of a polymorphic note is based at least in part on the content of the note and any recent activity of the note. By way of example, if a note contains content that includes media content (e.g., pictures, video, and the like), the note may be displayed in a larger size so that the content can be more easily seen. In one embodiment, the media content can be displayed in a separate window to maximize the available display size. Similarly, if there has been recent activity (e.g., adding new content, receiving replies, receiving comments, etc.) with respect to the polymorphic note, the note may be rendered in a larger size to draw attention to the recent activity.

Once the order, highlights, and sizes of the polymorphic notes have been determined, the polymorphic note manager 103 renders and displays the graphical user interface on the requesting UE 101 (step 515). This rendering is based at least in part on the display capabilities of the UE 101. For example, if the UE 101 is a portable device (e.g., a smartphone) with a limited display size, the graphical user interface can be scaled based on how much detail can be rendered in the available display. It is noted that in any UE 101, there likely will be more polymorphic notes to display than are viewable at any one time. As a result, the polymorphic note manager, as a default, may render the current (e.g., based on time) note in a central portion of the graphical user interface and then future and past notes extending out therefrom to the limit of the display size. The user may then scroll forwards or backwards in time to see other available notes. In this way, the user can quickly scan or navigate along the timeline or notestream of polymorphic notes. In another embodiment, the different parts of the polymorphic notes can be split under tabs depending on the categories of the data in the polymorphic notes.

Figure 6:
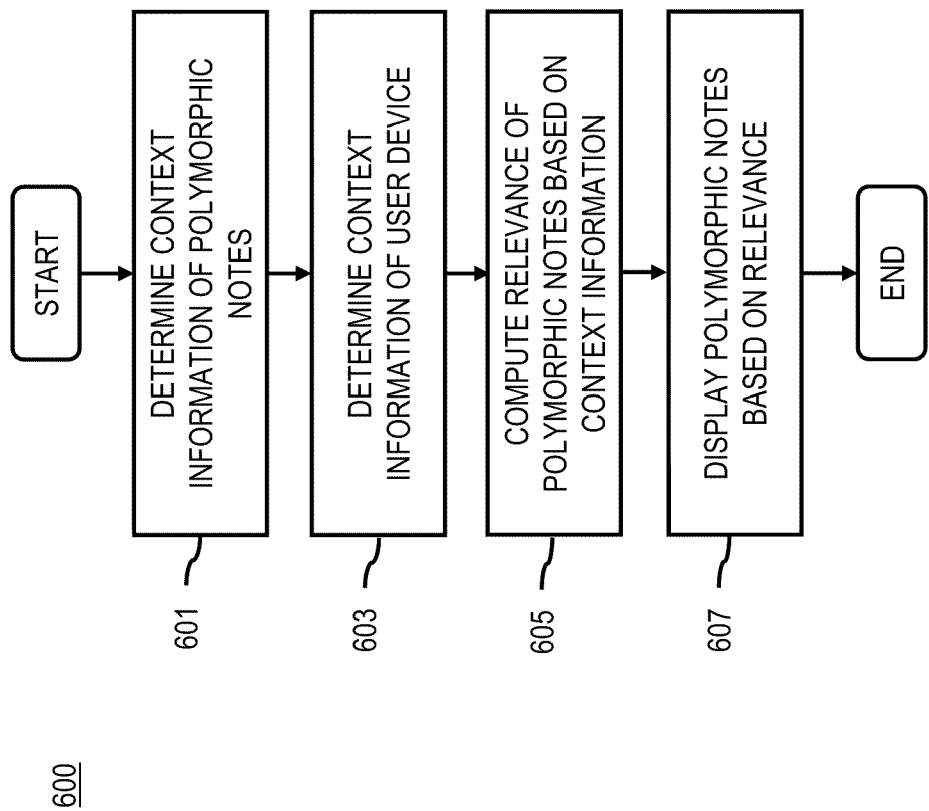
FIG. 6 is a flowchart of a process for determining relevance factors for presenting polymorphic notes in a graphical user interface, according to one embodiment.

FIG. 6 is a flowchart of a process for determining relevance factors for presenting polymorphic notes in a graphical user interface, according to one embodiment. In one embodiment, the polymorphic note manager 103 performs the process 600 and is implemented in, for instance, a chip set including a processor and a memory as shown in FIG. 15. It is noted that process 500 of FIG. 5 presents the polymorphic notes in a graphical user interface based on relevance with respect to date and time (e.g., either the date associated with the polymorphic note or the creation date). The process 600 expands on this concept and introduces the capability to present the polymorphic notes in an order based on other criteria (e.g., people, location, reminders, task status, or a combination thereof) in addition to or as an alternate to time. In one embodiment, each criteria may be shown under respective tabs for viewing on a mobile device.

In step 601, the polymorphic note manager 103 determines a set of context information corresponding to the polymorphic notes that are to be displayed. This context information (e.g., people, location, reminders, task status, etc.) is obtained or parsed from the polymorphic note or metadata associated with the polymorphic note. In addition, the context information may be obtained from related services 111 in the service platform 105. For example, to obtain location information (e.g., directions, map coordinates, etc.), the polymorphic note manager 103 may obtain an address from the polymorphic note and request additional location information from a mapping or navigation service. Similarly, the polymorphic note manager 103 may obtain additional information about an identified name in the polymorphic note by retrieving the additional information from a contacts service. Optionally, the polymorphic note manager 103 may obtain similar context information about the requesting UE 101 or a user associated with the requesting UE 101 (step 603). In one embodiment, the user is registered in a social networking service. The contacts of his phone and/or desktop are synchronized with the service. That service may then provide a contacts service to the polymorphic note manager 103.

Next, the polymorphic note manager 103 computes a relevance factor for each of the polymorphic notes to be displayed based on the context information (step 605). In one embodiment, the relevance factors of the notes are computed based on the context information of the polymorphic notes with respect to the context information of the requesting UE 101. For example, if the context information of the UE 101 indicates that the user is located at a place, the polymorphic note manager 103 may determine the relevance of the notes based on the proximity of an associated location. Similarly, if the context information (e.g., a call log) indicates that the UE 101 contacts a particular person or set of people most often, those people can be used to determine the relevance factors of the notes by determining whether the UE 101 contacts are associated with any of the polymorphic notes to be displayed. This process can be repeated for any element of the available contextual information. It is also contemplated that any combination of the contextual information (e.g., people and location) may be used to determine relevance factors, and that each attribute may be weighted separately. In one embodiment, the combination and corresponding weighting of each attribute in the combination may be predetermined by, for instance, a service provider, network operator, and the like. In addition or alternatively, the combination and weighting may be specified or modified by the user or other authorized users.

The polymorphic note manager 103 can then use the relevance factor to determine whether a particular polymorphic note is displayed and then the order for displaying the polymorphic notes (step 607). In one embodiment, the polymorphic note manager 103 can define a relevance factor threshold to determine whether a particular polymorphic note is displayed (e.g., if the relevance factor of a note is higher than the threshold then it is displayed; if not, the note is not displayed). In another embodiment, the order of the polymorphic notes can be determined by the relevance factors (e.g., notes are displayed in order of their relevance factors). In yet another embodiment, the notes may be displayed in loose chronological order as described above, but the focus of the graphical user interface can be made to change based on the order of the relevance factor. For example, the focus may be placed on a note with the highest relevance factor. When the user selects to view the next relevant note, the focus can then shift along the timeline to the note with the next highest relevance factor.

Figure 7:
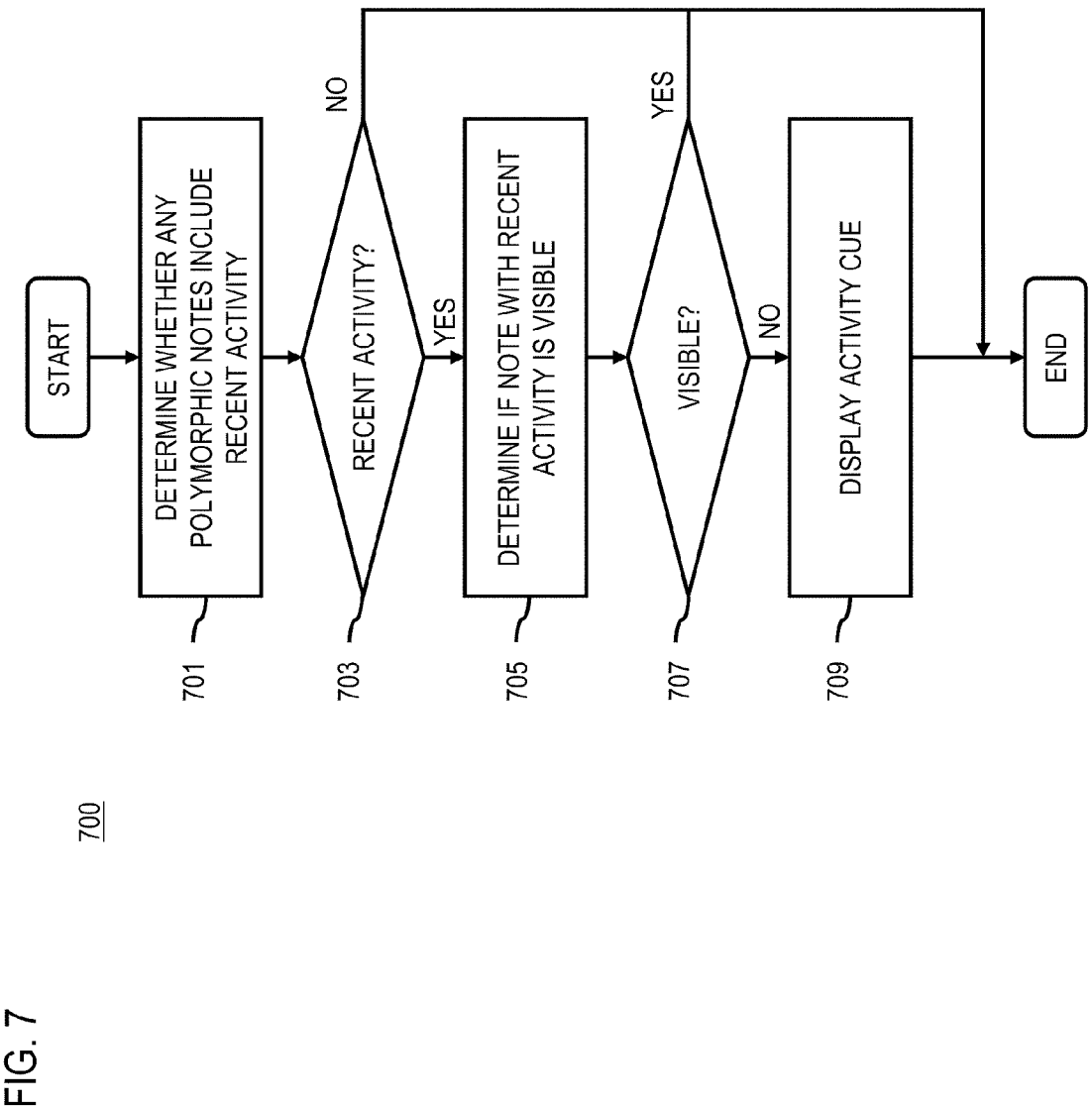
FIG. 7 is a flowchart of a process for displaying a recent activity cue related to polymorphic notes in a graphical user interface, according to one embodiment.

FIG. 7 is a flowchart of a process for displaying a recent activity cue related to polymorphic notes in a graphical user interface, according to one embodiment. In one embodiment, the polymorphic note manager 103 performs the process 700 and is implemented in, for instance, a chip set including a processor and a memory as shown in FIG. 15. It is noted that because of limited display sizes, it is possible that activity may take place in a polymorphic note that is currently not visible in the graphical user interface. For example, the one or more of the authorized users of a note may have sent an RSVP, provided a comment, or completed a task with respect to a note. In this case, the process 700 enables the polymorphic note manager to display a recent activity cue in the graphical user interface to direct the user to the note or notes with the recent activity.

In steps 701 and 703, the polymorphic note manager 103 determines whether one or more of the polymorphic notes includes recent activity. By way of example, the determination may be made by monitoring note generation and/or modification activity in the user note database 113. In addition or alternatively, a notification or alert may be received at the polymorphic note manager 103 each time a user updates information in one of the polymorphic notes. If there is recent activity with respect to one or more of the polymorphic notes, the polymorphic note manager 103 determines whether any of the one or more polymorphic notes are currently visible in the graphical user interface (steps 705 and 707). As described above, the number of polymorphic notes usually exceeds the display capabilities of the UE 101, resulting in only a limited number of notes being visible on the screen at the same time. Notes which do not have the focus of the graphical user interface typically are not visible. If any of the one or more polymorphic notes with recent activity are not visible, the polymorphic note manager 103 displays one or more corresponding recent activity cues in the graphical user interface to indicate a relative location of the notes (step 709). In one embodiment, this recent activity is typically an arrow with an alert symbol or message to indicate the direction the user should scroll the currently active user interface window to view the corresponding notes. The number of cues is used to indicate the number or relative number of notes with recent activity.

FIG. 8 is a diagram of a graphical user interface presenting polymorphic notes, according to one embodiment. As shown, the user interface 800 depicts polymorphic notes in a loose chronological order along a timeline or notestream. For example, notes are displayed according to the specific date and time associated to them. If they have not been given a specific time, they are displayed according to when they were created. In this way, time-based and non-time based notes are shown in same user interface 800. When a user navigates to the notestream, the most current note 801 (e.g., the note most closely matching the current time) is centered in the screen 800. This view enables the full spectrum of polymorphic notes to be viewed in a time, whether or not they have a concrete time associated to them.

The user interface screen 801 also provides a continuous, scannable presentation of all notes. As shown, notes are divided by day, with dotted lines 803 separating consecutive days. The current focus position is represented by double lines 805. Accordingly, notes that occur in the future (e.g., notes 807 and 809) are displayed to the right of the double lines 805, and notes that occur in the past (e.g., note 811) are displayed to the left of the double lines 805. The user can scroll to the left to view additional notes in the past and to the right view additional notes in the future. The past direction of the notestream combines notes that the user has created, received, or have scheduled for a time that has passed. This enables the user to scan all notes in a continuous visual manner. The future direction of the notestream reveals notes that have been associated with a future time, thereby enabling the user to look ahead.

In this example, notes in the notestream are consistent in their horizontal size, but vary in vertical scale based on their content and recent activity. For example, if the note has no associated people, place, or time, the note is displayed as a small note. As more information is added the note can grow to a medium size and then a large size. If there is an image associated with the note, the image is also displayed. Small notes can be stacked vertically, medium notes can be paired with small notes, and large notes can stand alone to maximize the available display area. Notes may contain elements (e.g., visual elements) to make them stand out from one another. For example, a band atop each not indicates to which category or notebook the note belongs. At the top left corner, some notes (e.g., note 801) have additional indicator icons.

The user interface screen 800 further visually highlights shared items (e.g., notes 811 and 813) with arrow icons 815*a* and 815*b*, and visually highlights notable items (e.g., notes 801 and 817) with star icons 819*a* and 819*b*. In addition, the user interface screen 800 includes an inbox 818 portion of the screen to display notes that others have shared with the user and a notable notes 821 portion of the screen to display notes that the user wants to keep in the forefront.

The user interface screen 800 may display one or more recent activity cues (e.g., activity cues 823*a*-823*c*) to indicate that there are notes that are currently not visible in the user interface 800 that contain recent activity. In this way, the user need not take any action to be directed to active notes. As shown, an activity cue (e.g., activity cues 823*a*-823*c*) is represented by an arrow with an exclamation point. The arrow points in the direction (e.g., either left or right) the user should scroll to view the corresponding note. The vertical position of the arrow indicates the corresponding vertical position of the note in the user interface 800. In this example, there is one note in the past that has recent activity as indicated by activity cue 823*a*, and two notes in the future that have recent activity as indicated respectively by activity cues 823*b* and 823*c*. In one embodiment, the items in the user interface screen 800 can be arranged as floating items. Then, the items can move in the user interface screen 800 at different speeds. IN certain embodiments, the floating items may be only those items which are otherwise not currently visible and outside the current display. In this case, the display is arranged in two or more layers so that user can grip to the floating items in the different layers. In one embodiment, the user can select one or more floating items to review more deeply.

In the notestream, clicking on a note that is not centered (e.g., a note other than note 801) causes the notestream to track to the side and center on the clicked note. This scanning and centering behavior advantageously encourages the user to spend time in the notestream and view notes in the context in which they were created or are scheduled. On clicking the centered note, the user taken to a full view of the note to view additional details (see, e.g., FIG. 12 for an example of a full view of a polymorphic note).

Figure 9A:
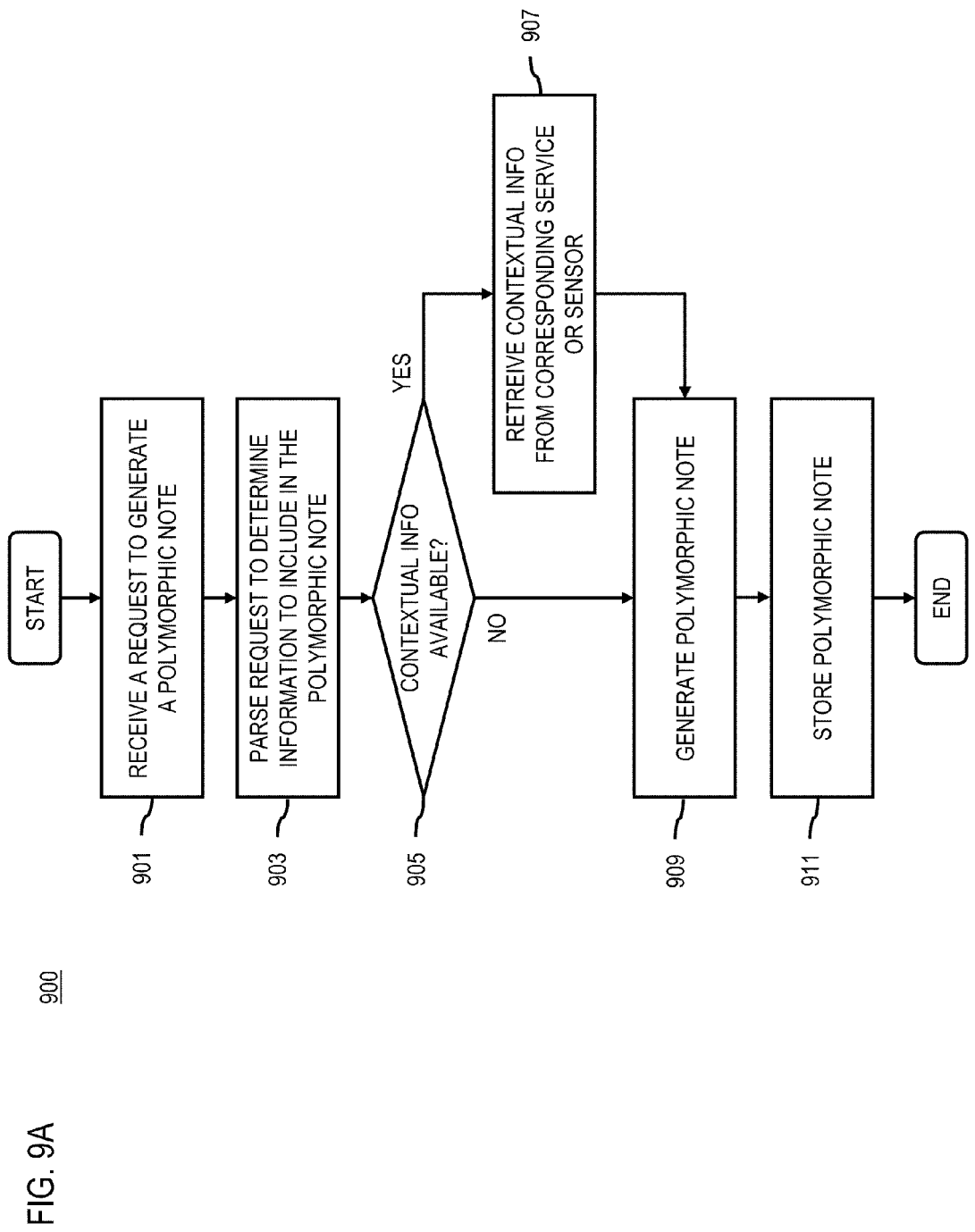
FIGS. 9A and 9B are flowcharts of a processes for generating a polymorphic note, according to various embodiments.
Figure 9B:
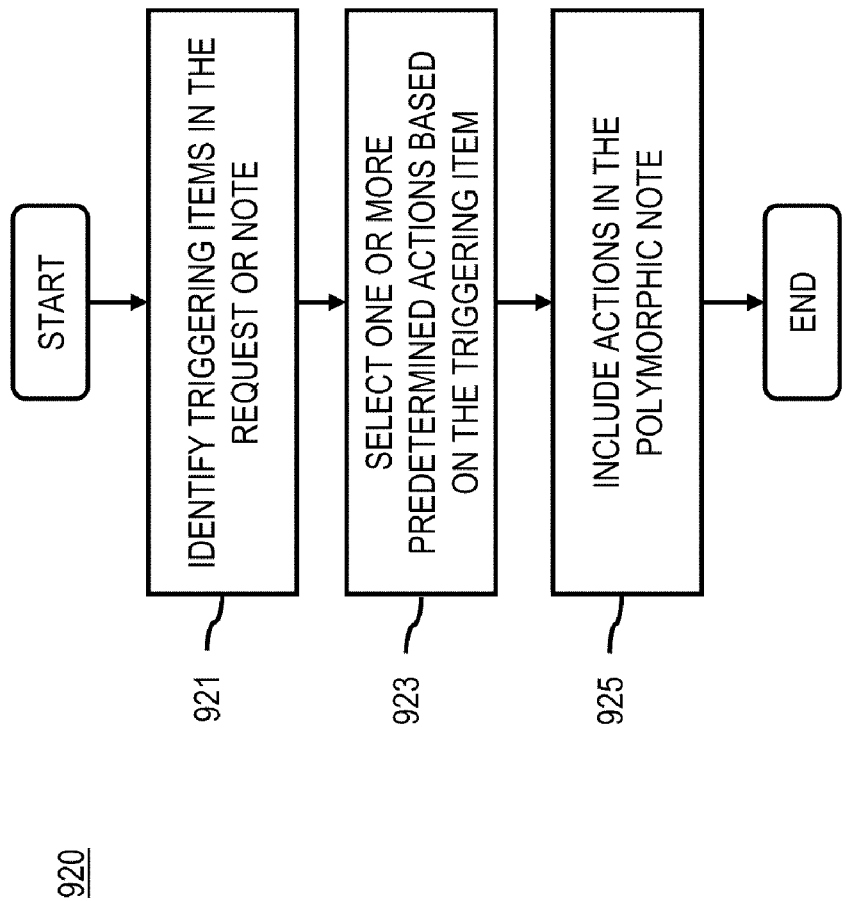

FIGS. 9A and 9B are flowcharts of a processes for generating a polymorphic note, according to various embodiments. FIG. 9A depicts a general process for generating the polymorphic note and FIG. 9B depicts an optional process for including predetermined actions in the polymorphic note. In one embodiment, the polymorphic note manager 103 performs the process 900 of FIG. 9A and the process 920 of FIG. 9B and is implemented in, for instance, a chip set including a processor and a memory as shown in FIG. 15. In step 901 of FIG. 9A, the polymorphic note manager 103 receives a request from a device to generate a polymorphic note. The device may be associated with a user, a service provider, content provider, network provider, or any other entity authorized or capable of initiating the request. As discussed previously, the polymorphic note may include information traditionally associated with a plurality of application types (e.g., a calendar application, a task management application, a note application, an e-mail application, an instant messaging application, a text messaging application, a social networking application, a location application, or a combination thereof). The support for multiple application types in the polymorphic note enables polymorphic note manager 103 to avoid imposing a strict data structure for input data. For example, to record an event in a traditional calendaring application, a user inputs a specific date, time, subject, etc. in the format required by the application. Instead, under the approach described herein, the user of the device can initiate the creation of a polymorphic note with just an idea or concept of an event (e.g., "I want to go hiking"), and the user need not know the specifics of the event (e.g., where, when, with whom, etc.). As the concept develops, the polymorphic note can record the evolution from concept to event.

The polymorphic note manager 103 then parses any input provided as part of the request to determine as much information as possible to include in the polymorphic note (step 903). For example, the parsing can be used to identify any phrases related to or specifying web links, phone numbers, locations, email addresses. The manager 103 can also parse the information to determine whether there are any referenced media content items or requested social tools (e.g., based phrases related to one or more of the social tools). The parsed information may also be used to identify any contextual information (e.g., time, place, location, etc.) or indicators of contextual information that can be retrieved from either one of the services 111 of the service platform 105 (e.g., a weather service to obtain a weather forecast for the place, date, and/or time described in the note) or from a sensor of the UE 101 associated with the device (steps 905 and 907). For example, the parsed information may include a phrase "dinner at Paul's house." In this case, the polymorphic note manager 103 identifies the phrase as a possible invitation and that the location is Paul's house. Accordingly, the polymorphic note manager 103 searches the device's contact list (or other contact lists available via a contact service or another device) to identify Paul and retrieve a home address for Paul from the list or service. The manager 103 then obtains directions to Paul's home address from a mapping service of the service platform 105 and includes then address in the polymorphic note. The polymorphic note manager 103 can even determine a location based on the time. For example, the manager 103 can determine (1) whether Paul has a summer cottage, and (2) the periods of time (e.g., the summer) when Paul can be found at the cottage. The manager can then suggest the location (e.g., either Paul's home or Paul's summer cottage) based on the time of year. Similarly, the manager 103 can determine a location based on a daily work schedule or routine (e.g., work location during the day and home location at night).

After obtaining available information (e.g., contextual associations, media content references, social tools, etc.) identified by the parsing, the polymorphic note manager 103 generates the polymorphic note (step 909) and stores the note for later access or sharing by the device (step 911).

FIG. 9B depicts an optional process for including predetermined actions in the polymorphic note based on triggering items include in the note or the request to generate the polymorphic note. In step 921, the polymorphic note manager 103 parses the polymorphic note or the information received in the request to identify any triggering items. In one embodiment, a triggering item is information that is associated with an action or function of the polymorphic note manager 103, the services 111, the service platform 105, or any similar component available over the communication network 107. This information is, for instance, related to time, people, location, tasks, and other PIM information.

On identifying one or more triggering items, the polymorphic note manager 103 selects one or more predetermined actions that correspond to the identified triggering items (step 923). For example, the triggering item is information specifying the user's friend Matt, along with a restaurant, and meeting time, the polymorphic note manager 103 may select one or more actions to display the location of the restaurant on a map, create an online reservation at the determined time, etc. The polymorphic note manager 103 then includes the selected actions in the polymorphic note. For example, the note may contain scripts or other commands to direct the performance of the actions (step 925).

In one embodiment, the polymorphic note manager 103 can operate in conjunction with or be embedded in an external application (e.g., a word processor) to monitor for triggering items that can be used to generate polymorphic notes. For example, as a user types information in the word processor application, the polymorphic note manager 103 parses the typed information to identify triggering items according to the process 920. If the triggering items are detected, then polymorphic note manager 103 identifies the corresponding actions using the process 920 and then generates the polymorphic note to include the actions as described with respect to the process 900.

In one sample use case, one or more users may happen to be shopping in the same area of a city and have their location services configured to automatically share their locations. In this example, the triggering item includes information on at least location and people. Accordingly, the polymorphic note manager 103 may interface with the location service to initiate a suggestion as a polymorphic note to the users that they can easily meet up a nearby location (e.g., a coffee shop on Main Street). In some embodiments, the polymorphic note manager 103 may consult other polymorphic notes or PIM information (e.g., calendar and schedules) to automatically determine whether a meetup is possible and incorporate the scheduling information in the note. The note can also include, for instance, a voting social tool that asks the users to vote the place and time for meeting that the users can quickly respond. If the users accept the suggestion, the polymorphic note manager 103 automatically records the information related to the selected meetup (e.g., location, people, time, etc.) in the note. T It is also contemplated that the polymorphic note manager 103 may convert an application type associated with another application into a polymorphic note. In this way, for instance, the external application file type may be used to suggest or create information that will be converted into a polymorphic at a later date.

FIG. 10 is a flowchart of a process for storing and sharing a polymorphic note in an electronic notebook, according to one embodiment. In one embodiment, the polymorphic note manager 103 performs the process 1000 and is implemented in, for instance, a chip set including a processor and a memory as shown in FIG. 15. In step 1001, the polymorphic note manager 103 stores previously generated polymorphic notes in one or more electronic notebooks. As discussed earlier, electronic notebooks provide a convenient way to shares notes by enabling the device to manipulate collections (e.g., notebooks) of notes rather than each individual note. As part of the sharing process, the polymorphic note manager 103 assigns an attribute to the electronic notebook (step 1003). This attribute, for instance, specifies the category of the notebook and the polymorphic notes contained therein (e.g., work, home, personal, sports, etc.). Each attribute may also be associated with a list of users who will receive and share the notebook. For example, a notebook with the work attribute can provide for sharing of the notebook among a group of the user's coworkers. A notebook marked home can provide sharing among the user's immediate family. In addition, the level of access may vary by group. For example, the work notebook may specify sharing as read-only; while the home notebook may specify sharing with full read/write access.

It is also contemplated that a notebook may not enable sharing altogether. For example, a notebook with the attribute of personal may be designated as private and not allow sharing. Accordingly, at step 1005, the polymorphic note manager 103 determines whether the notebook's attribute indicates that the notebook should be shared. If the attribute indicates no sharing, the polymorphic note manager 103 maintains the privacy of the notebook and prevents the sharing of the notebook (step 1007). In certain embodiments, the identification of the notebook is also protected such that an unauthorized user is not able to view even the title of a protected notebook. If the attribute indicates that sharing is allowed, the polymorphic note manager 103 identifies the users indicated by the attributed as authorized to access the notebook and enables access to the notebook for those authorized users (step 1009). It is contemplated that the polymorphic note manager 103 may use any mechanism (e.g., user name/password, network address filtering, biometric security, etc.) to authenticate the users to ensure that only authorized can access the notebook.

In another embodiment, the polymorphic note manager 103 may share individual polymorphic notes without first storing the note in an electronic notebook. In this case, the manager 103 applies the sharing attribute to the specific polymorphic note rather than the electronic notebook.

In another embodiment, the polymorphic note may be shared between devices of differing capabilities (e.g., between a desktop computer and a mobile device). In this case, the polymorphic note manager 103 may share or synchronize only those parts of the polymorphic note that is appropriate to the device. For example, due to limited device memory in a mobile device, the desktop computer may share only a subset of the media content included in a polymorphic note. In some embodiments, the desktop computer may then share the remaining media content as, for instance, a link. In addition, if the one of the devices is note compatible with the polymorphic note service (e.g., connect access polymorphic note file types), the polymorphic note may provide a summary of the polymorphic in a file format (e.g., e-mail, text message, etc.) that is compatible with the device.

Figure 11:
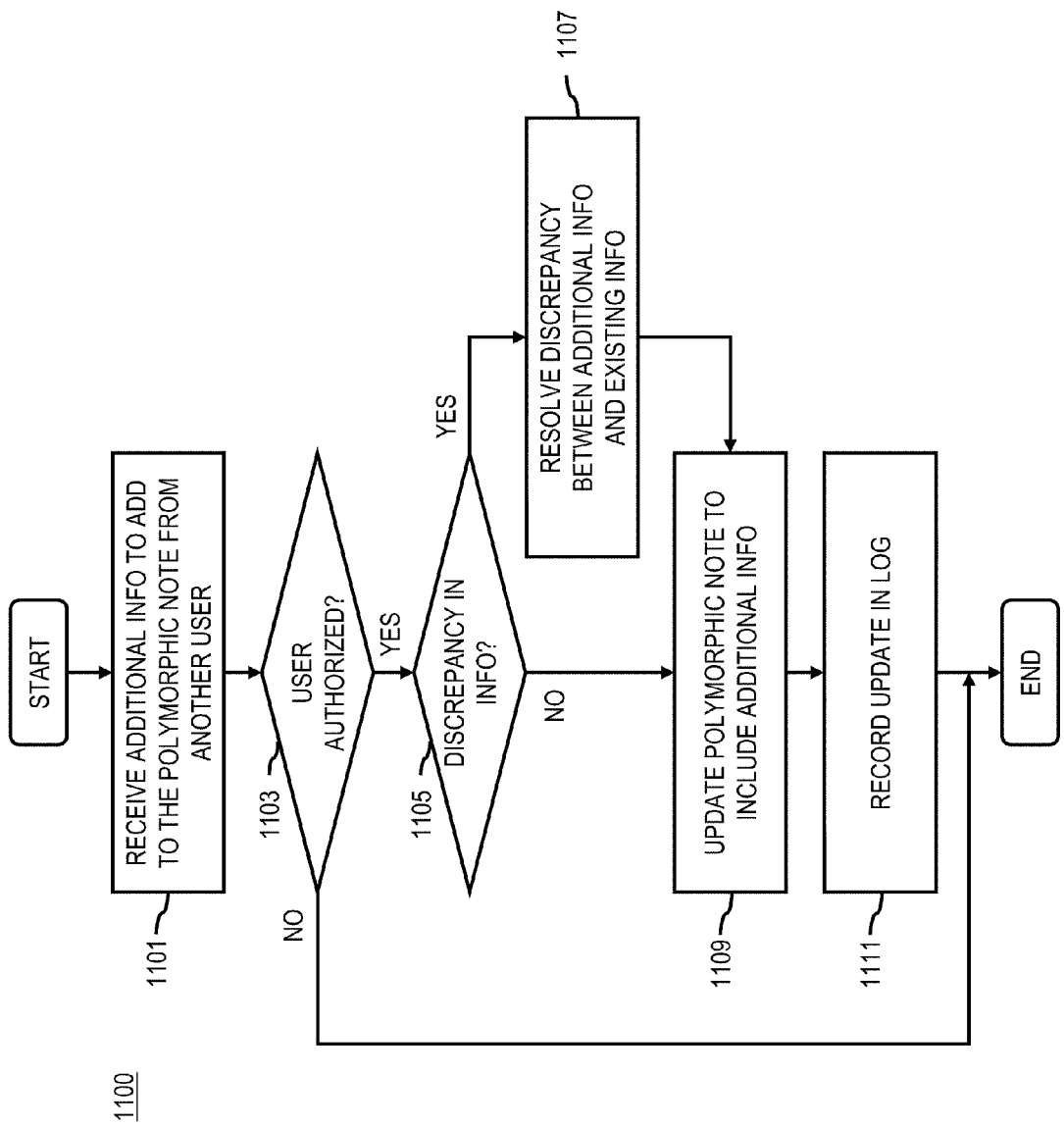
FIG. 11 is flowchart of a process for recording updates to the polymorphic note, according to one embodiment.

FIG. 11 is flowchart of a process for recording updates to the polymorphic note, according to one embodiment. In one embodiment, the polymorphic note manager 103 performs the process 1100 and is implemented in, for instance, a chip set including a processor and a memory as shown in FIG. 15. The process 1100 assumes that a polymorphic note created by a first device has been shared successfully shared with at least another device. In step 1101, the polymorphic note manager 103 receives additional information to add to the shared polymorphic note from the other device. By way of example, this additional information may include any information element related to either polymorphic note or a communication (e.g., e-mail, text message, instant message, etc.) about the polymorphic note. The information may also include responses or inputs to any the social tools included in the polymorphic note.

On receipt of the information, the polymorphic note manager 103 determines whether the device is authorized to make the changes (e.g., have read/write access as opposed to read-only access) (step 1103). If the device is not authorized the process ends. Otherwise, the polymorphic note manager 103 determines whether the additional information provided by the other device conflicts with any information currently in the polymorphic note (step 1105). If a conflict is detected (e.g., the same information has been changed by multiple devices), the polymorphic note manager 103 initiates a process to resolve the discrepancy (step 1107). As discussed earlier, in a social setting, the polymorphic note manager 103 attempts to resolve the conflict through negotiations between the users of the devices causing the conflict or discrepancy. More specifically, the polymorphic note manager 103 retrieves contact information from, for instance, a contact list of either one or the devices or a public directory and initiate a communication session between the two parties to resolve the conflict. If the conflict cannot be resolved through negotiation, then the polymorphic note manager 103 can apply a predetermined conflict resolution rule (e.g., accept the latest update, accept the first update, etc.).

After resolving any discrepancy or if there were not discrepancies, the polymorphic note manager 103 updates the polymorphic note to include the additional information (step 1109) and records the update in a log maintained with the polymorphic note (step 1111). The log, for instance, provides a history of updates and changes to the polymorphic note. In addition or alternatively, a history of updates and changes to the polymorphic note may be stored in the body of the note itself instead of the log. In another embodiment, the log is stored in the body of the polymorphic note.

FIG. 12 is a diagram of a user interface for interacting with a polymorphic note, according to one embodiment. As shown, the user interface 1200 depicts an example polymorphic note including a content region 1201, association modules 1203, ideas region 1205, and settings and actions toolbar 1207. The content region 1201 is an area where users input content and includes text, media, and social tools that have been included in the polymorphic note. The association modules 1203 display and enable users to input contextual associations such as time, people, location, and reminders to a polymorphic note. The ideas region 1205 displays suggestions for ideas based on the content of the polymorphic note. The settings and actions toolbar 1207 contain features that apply to the note as a whole, i.e., to the polymorphic note container and everything that belongs with it.

The content region 1201 further includes three components: (1) the content tool bar 1209, (2) the text and media region 1211, (3) and the coordination tools region 1213. The content tool bar 1209 provides touchpoints for inserting different media types, adding coordination tools (e.g., task list, comments), and applying standard or customized themes to a note. The text and media region 1211 is the main component of the polymorphic note user interface. For example, the text and media region 1211 can contain any combination of text, images, video, audio, and other documents. It is designed to provide maximum flexibility across the range from simple text-only notes to carefully crafted invitations and memories with multimedia elements. The coordination tools region 1213 supports the ability to share comments and carry on a conversation around a particular note. The region 1213 also supports the ability to share and/or assign tasks related to the note, and the ability to vote on different options when trying to coordinate a group of people.

Figure 13A:
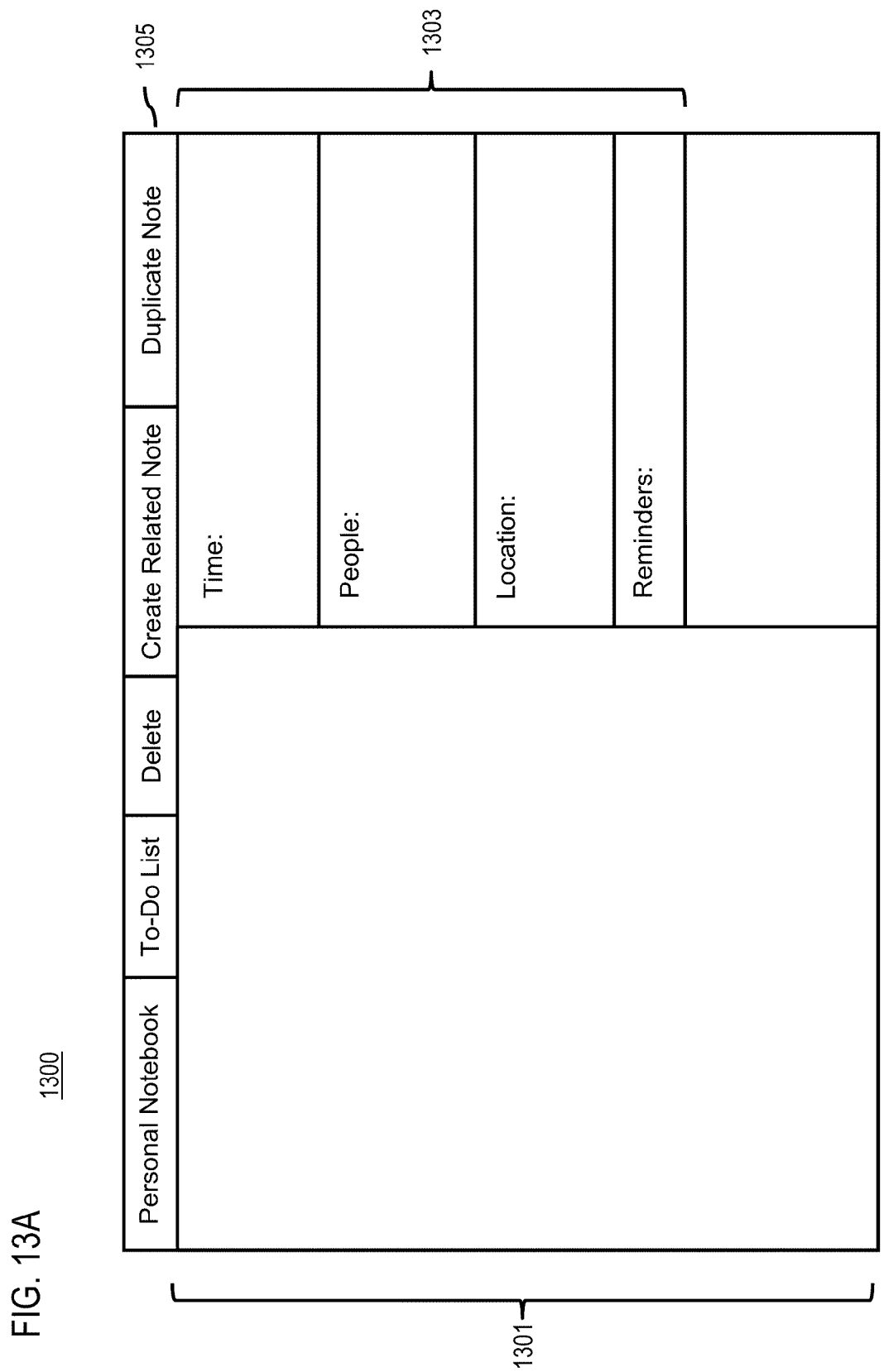

FIGS. 13A and 13B are diagrams of user interfaces for entering information into a polymorphic note, according to various exemplary embodiments. FIG. 13A depicts a user interface 1300 of blank input screen for creating a polymorphic note. The user interface 1300 is similar to the user interface 1200 of FIG. 12 described above and includes a content region 1301, association modules 1303, and settings and actions toolbar 1305. To request creation of a polymorphic note, the user begins typing information in the content region 1301. In one embodiment, the user interface 1300 for entering information into a polymorphic note computer program code may have an interface for connectivity to different document or application types so that the polymorphic note can be generated from the different document or application types when inputting text into the different document or application type. The polymorphic note will capture the relevant information for creating a polymorphic note from the different document or application type. The note can remain part of the document or application type or can be detached from the document or application type. The polymorphic note may generate a link or equivalent connection to that document or application type, if needed. By way of example, a music file is an example of application type.

FIG. 13B depicts a user interface 1320 in which the user has started to type information in the content region 1301. As the user types, the polymorphic note manager 103 parses the information to determine contextual associations. The underlined phrase 1321 ("Friday Dec. 12th") is parsed to indicate the date for a planned event. Although, the user has not input a year, the polymorphic note manager 103 can infer the complete date based on analyzing when December 12th falls on a Friday and/or by assuming that the user is likely referring to the current year. Accordingly, the polymorphic note manager 103 displays the date in the time context 1323 within the association modules region 1303. Similarly, the underlined phrase 1325 ("19:30") is parsed to indicate the time for the planned event. The polymorphic note manager 103 includes this time in the time context 1323 along with the date.

The underlined phrase 927 ("340 Moon Street") is parsed to indicate an address of the planned event. The parsed address is incomplete. As a result, the polymorphic note manager 103 can use a mapping service, a location sensor in the user's device, and/or calendars or contacts of users related to the note to determine the city information. In another embodiment, the polymorphic note manager 103 may infer the city information to complete the address from, for instance, account information associated with the user. In this case, polymorphic note manager 103 determines the complete address and displays this address in the location context area 1329 within the association modules region 1303.

In the examples of FIGS. 13A and 13B, the user may confirm the accuracy of the parsed information and make modifications accordingly.

The processes described herein for presenting polymorphic notes in a graphical user interface may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
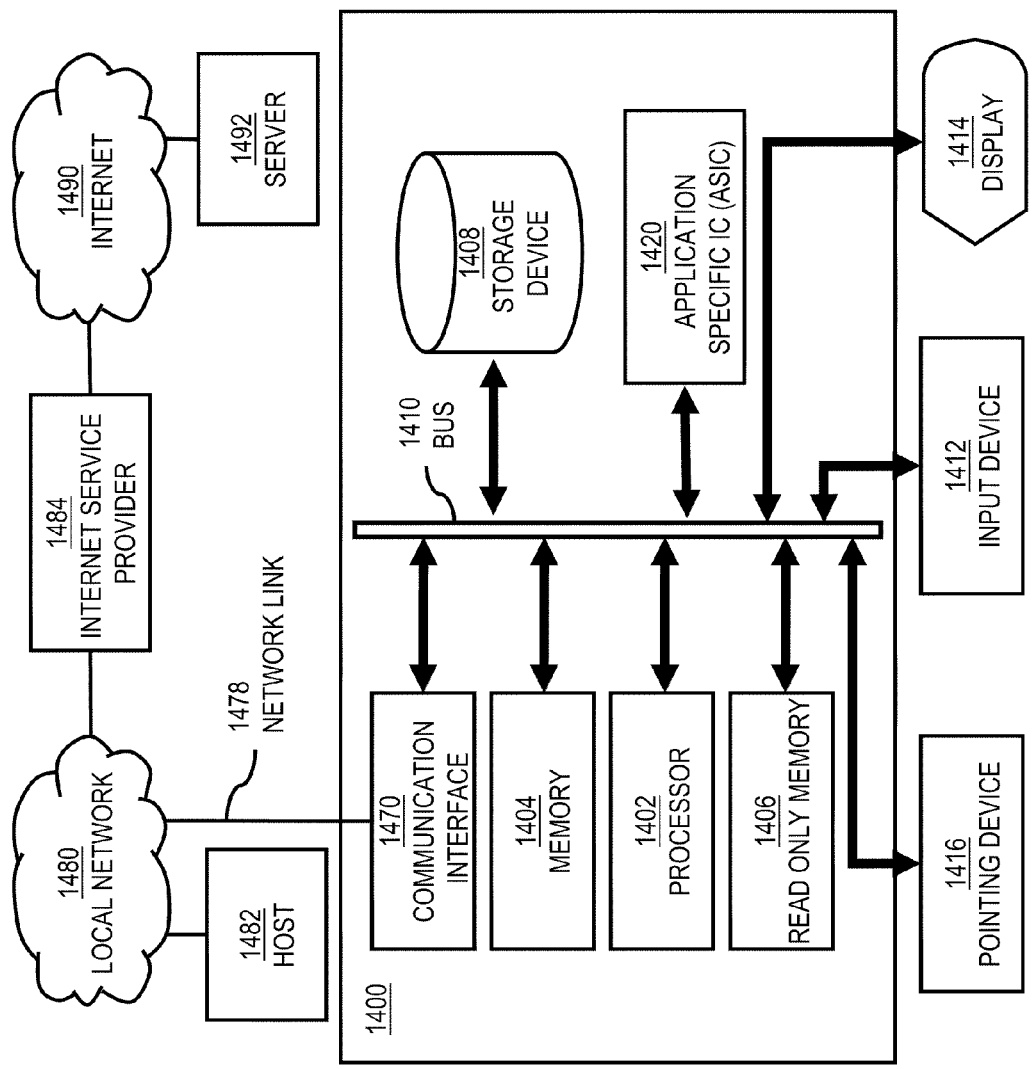
FIG. 14 is a diagram of hardware that can be used to implement an embodiment of the invention.

FIG. 14 illustrates a computer system 1400 upon which an embodiment of the invention may be implemented. Although computer system 1400 is depicted with respect to a particular device or equipment, it is contemplated that other devices or equipment (e.g., network elements, servers, etc.) within FIG. 14 can deploy the illustrated hardware and components of system 1400. Computer system 1400 is programmed (e.g., via computer program code or instructions) to present polymorphic notes in a graphical user interface as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of presenting polymorphic notes in a graphical user interface.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to present polymorphic notes in a graphical user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random access memory (RAM) or other dynamic storage device, stores information including processor instructions for presenting polymorphic notes in a graphical user interface. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk or flash card, for storing information, including instructions, that persists even when the computer system 1400 is turned off or otherwise loses power.

Information, including instructions for presenting polymorphic notes in a graphical user interface, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners and external disks. In general the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 107 for presenting polymorphic notes in a graphical user interface.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1420.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system 1400 can be deployed in various configurations within other computer systems, e.g., host 1482 and server 1492.

At least some embodiments of the invention are related to the use of computer system 1400 for implementing some or all of the techniques described herein. According to one embodiment of the invention, those techniques are performed by computer system 1400 in response to processor 1402 executing one or more sequences of one or more processor instructions contained in memory 1404. Such instructions, also called computer instructions, software and program code, may be read into memory 1404 from another computer-readable medium such as storage device 1408 or network link 1478. Execution of the sequences of instructions contained in memory 1404 causes processor 1402 to perform one or more of the method steps described herein. In alternative embodiments, hardware, such as ASIC 1420, may be used in place of or in combination with software to implement the invention. Thus, embodiments of the invention are not limited to any specific combination of hardware and software, unless otherwise explicitly stated herein.

The signals transmitted over network link 1478 and other networks through communications interface 1470, carry information to and from computer system 1400. Computer system 1400 can send and receive information, including program code, through the networks 1480, 1490 among others, through network link 1478 and communications interface 1470. In an example using the Internet 1490, a server host 1492 transmits program code for a particular application, requested by a message sent from computer 1400, through Internet 1490, ISP equipment 1484, local network 1480 and communications interface 1470. The received code may be executed by processor 1402 as it is received, or may be stored in memory 1404 or in storage device 1408 or other non-volatile storage for later execution, or both. In this manner, computer system 1400 may obtain application program code in the form of signals on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red carrier wave serving as the network link 1478. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

FIG. 15 illustrates a chip set 1500 upon which an embodiment of the invention may be implemented. Chip set 1500 is programmed to present polymorphic notes in a graphical user interface as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1500, or a portion thereof, constitutes a means for performing one or more steps of presenting polymorphic notes in a graphical user interface.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to present polymorphic notes in a graphical user interface. The memory 1505 also stores the data associated with or generated by the execution of the inventive steps.

Figure 16:
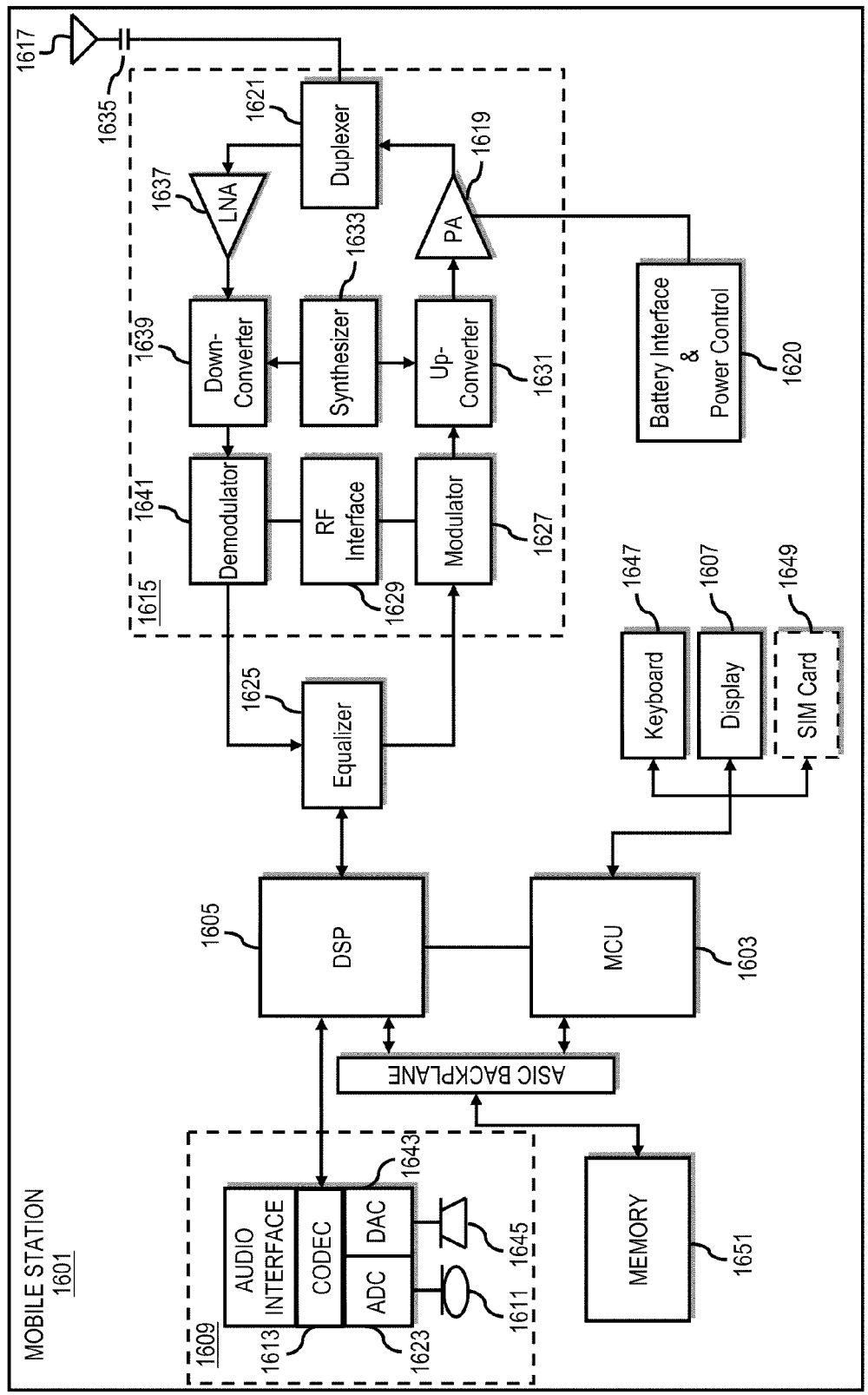
FIG. 16 is a diagram of a mobile terminal (e.g., a handset) that can be used to implement an embodiment of the invention.

FIG. 16 is a diagram of exemplary components of a mobile terminal (e.g., handset) for communications, which is capable of operating in the system of FIG. 1, according to one embodiment. In some embodiments, mobile terminal 1600, or a portion thereof, constitutes a means for performing one or more steps of presenting polymorphic notes in a graphical user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1603, a Digital Signal Processor (DSP) 1605, and a receiver/transmitter unit including a microphone gain control unit and a speaker gain control unit.

A main display unit 1607 provides a display to the user in support of various applications and mobile terminal functions that perform or support the steps of presenting polymorphic notes in a graphical user interface. The display 16 includes display circuitry configured to display at least a portion of a user interface of the mobile terminal (e.g., mobile telephone). Additionally, the display 1607 and display circuitry are configured to facilitate user control of at least some functions of the mobile terminal. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency in order to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile terminal 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile terminal 1601 to present polymorphic notes in a graphical user interface. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the terminal. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile terminal 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable storage medium known in the art. The memory device 1651 may be, but not limited to, a single memory, CD, DVD, ROM, RAM, EEPROM, optical storage, or any other non-volatile storage medium capable of storing digital data.

An optionally incorporated SIM card 1649 carries, for instance, important information, such as the cellular phone number, the carrier supplying service, subscription details, and security information. The SIM card 1649 serves primarily to identify the mobile terminal 1601 on a radio network. The card 1649 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a request to display a plurality of polymorphic notes on a graphical user interface of a device;
   determining an order of the plurality of polymorphic notes according to one or more associated dates corresponding to the plurality of polymorphic notes, and, if there is no associated date for one or more of the plurality of polymorphic notes, according to one or more creation dates corresponding to the one or more polymorphic notes;
   computing one or more relevance factors for the plurality of polymorphic notes based on a first set of context information corresponding to the plurality of polymorphic notes in relation to a second set of context information corresponding to the device; and
   causing displaying of the plurality of polymorphic notes in the graphical user interface based on the determined order and the one or more relevance factors.

2. A method of claim 1, wherein the context information includes time, people, location, reminders, task status, or a combination thereof.

3. A method of claim 1, further comprising:
   determining whether at least one of the plurality of polymorphic notes includes a recent activity;
   if the at least one polymorphic note includes the recent activity, determining whether the at least one polymorphic note is visible in the graphical user interface; and
   if the at least one polymorphic note is not visible, causing displaying of an activity cue to direct attention to the at least one polymorphic note.

4. A method of claim 1, further comprising:
   causing varying of one or more display sizes corresponding to respective ones of the plurality of polymorphic notes in the graphical user interface based on content, one or more recent activities, or a combination thereof of the respective polymorphic notes.

5. A method of claim 1, further comprising:
   determining that at least one of the plurality of polymorphic notes is shared; and
   causing highlighting of the at least one polymorphic note in the graphical user interface based on the sharing determination.

6. A method of claim 1, further comprising:
   receiving an input for designating at least one of the plurality of polymorphic notes as notable;
   causing highlighting of the at least one polymorphic note in the graphical user interface based on the designation.

7. A method of claim 1, wherein the graphical user interface displays the plurality of polymorphic notes in a dynamically navigable timeline.

8. An apparatus comprising:
   at least one processor; and
   at least one memory including computer program code,
   the at least one memory and the computer program code configured to, with the at least one processor, cause the apparatus to perform at least the following,
   receive a request to display a plurality of polymorphic notes on a graphical user interface of a device,
   determine an order of the plurality of polymorphic notes according to one or more associated dates corresponding to the plurality of polymorphic notes, and, if there is no associated date for one or more of the plurality of polymorphic notes, according to one or more creation dates corresponding to the one or more polymorphic notes,
   compute one or more relevance factors for the plurality of polymorphic notes based on a first set of context information corresponding to the plurality of polymorphic notes in relation to a second set of context information corresponding to the device, and
   cause displaying of the plurality of polymorphic notes in the graphical user interface based on the determined order and the one or more relevance factors.

9. An apparatus of claim 8, wherein the context information includes time, people, location, reminders, task status, or a combination thereof.

10. An apparatus of claim 8, wherein the apparatus is further caused to:
  determine whether at least one of the plurality of polymorphic notes includes a recent activity;
  if the at least one polymorphic note includes the recent activity, determine whether the at least one polymorphic note is visible in the graphical user interface; and
  if the at least one polymorphic note is not visible, cause displaying of an activity cue to direct attention to the at least one polymorphic note.

11. An apparatus of claim 8, wherein the apparatus is further caused to:
  cause varying of one or more display sizes corresponding to respective ones of the plurality of polymorphic notes in the graphical user interface based content, one or more recent activities, or a combination thereof of the respective polymorphic notes.

12. An apparatus of claim 8, wherein the apparatus is further caused to:
  determine that at least one of the plurality of polymorphic notes is shared; and
  cause highlighting of the at least one polymorphic note in the graphical user interface based on the sharing determination.

13. An apparatus of claim 8, wherein the apparatus is further caused to:
  receive an input for designating at least one of the plurality of polymorphic notes as notable;
  cause highlighting of the at least one polymorphic note in the graphical user interface based on the designation.

14. An apparatus of claim 8, wherein the graphical user interface displays the plurality of polymorphic notes in a dynamically navigable timeline.

15. A non-transitory computer-readable storage medium carrying one or more sequences of one or more instructions which, when executed by one or more processors, cause an apparatus to at least perform the following steps:
  receiving a request to display a plurality of polymorphic notes on a graphical user interface of a device;
  determining an order of the plurality of polymorphic notes according to one or more associated dates corresponding to the plurality of polymorphic notes, and, if there is no associated date for one or more of the plurality of polymorphic notes, according to one or more creation dates corresponding to the one or more polymorphic notes;
  computing one or more relevance factors for the plurality of polymorphic notes based on a first set of context information corresponding to the plurality of polymorphic notes in relation to a second set of context information corresponding to the device; and
  causing displaying of the plurality of polymorphic notes in the graphical user interface based on the determined order and the one or more relevance factors.

16. A non-transitory computer-readable storage medium of claim 15, wherein the apparatus is further caused to perform:
  determining whether at least one of the plurality of polymorphic notes includes a recent activity;
  if the at least one polymorphic note includes the recent activity, determining whether the at least one polymorphic note is visible in the graphical user interface; and
  if the at least one polymorphic note is not visible, causing displaying of an activity cue to direct attention to the at least one polymorphic note.

17. A non-transitory computer-readable storage medium of claim 15, wherein the graphical user interface displays the plurality of polymorphic notes in a dynamically navigable timeline.

* * * * *